US012579924B2

(12) United States Patent
Chen

(10) Patent No.: US 12,579,924 B2
(45) Date of Patent: Mar. 17, 2026

(54) DISPLAY COMPENSATION METHOD AND SYSTEM FOR DISPLAY PANEL AND DISPLAY DEVICE

(71) Applicant: TCL CHINA STAR OPTOELECTRONICS TECHNOLOGY CO., LTD., Guangdong (CN)

(72) Inventor: Jinjia Chen, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/028,783

(22) Filed: Jan. 17, 2025

(65) Prior Publication Data

US 2026/0051279 A1 Feb. 19, 2026

(30) Foreign Application Priority Data

Aug. 19, 2024 (CN) ......................... 202411134636.5

(51) Int. Cl.
*G09G 3/20* (2006.01)
*G09G 3/3225* (2016.01)
*G09G 3/36* (2006.01)

(52) U.S. Cl.
CPC ......... *G09G 3/2074* (2013.01); *G09G 3/2007* (2013.01); *G09G 3/3225* (2013.01);
(Continued)

(58) Field of Classification Search
CPC ....... G09G 2320/0233; G09G 2360/16; G09G 3/3225; G09G 3/3233; G09G 3/3607; G09G 3/2007; G09G 2320/0673; G09G 2320/0666; G09G 2320/0626; G09G 2320/0285; G09G 2320/0271;
(Continued)

(56) References Cited

U.S. PATENT DOCUMENTS 10,043,443 B2 * 8/2018 Zhang .................. G09G 3/2003
10,997,907 B2 * 5/2021 Baek ...................... G09G 3/006
(Continued)

*Primary Examiner* — Dismery Mercedes
(74) *Attorney, Agent, or Firm* — PV IP PC; Peter Stecher; Wei Te Chung

(57) ABSTRACT

This disclosure provides a display compensation method for a display panel, including: obtaining image data of a displayed image of the display panel when a first set of initial compensation coefficients is applied to control the display panel to display under a corresponding binding point grayscale; determining whether a performance index of the displayed image satisfies a standard based on the image data, and if not, obtaining area evaluation values respectively corresponding to display areas of the display panel based on average luminance and chrominance data corresponding to the display areas; obtaining a target area evaluation value based on the area evaluation values, and determining at least one display area corresponding to the target area evaluation value as a target area in a target area set; and obtaining a target compensation coefficient corresponding to the target area, and obtaining an output compensation coefficient based on the obtained target compensation coefficient.

19 Claims, 17 Drawing Sheets

(52) U.S. Cl.
CPC ... *G09G 3/3607* (2013.01); *G09G 2320/0233* (2013.01); *G09G 2320/0242* (2013.01); *G09G 2320/0271* (2013.01); *G09G 2320/0276* (2013.01); *G09G 2320/0626* (2013.01); *G09G 2320/0673* (2013.01); *G09G 2320/0693* (2013.01); *G09G 2360/127* (2013.01); *G09G 2360/145* (2013.01)

(58) Field of Classification Search
CPC ........... G09G 3/2074; G09G 2320/045; G09G 2320/0242; G09G 2320/0693; G09G 2360/147
See application file for complete search history.

(56) References Cited

U.S. PATENT DOCUMENTS

| | | | | |
|---|---|---|---|---|
| 11,922,851 | B2 * | 3/2024 | Ren | G09G 3/2074 |
| 12,027,083 | B2 * | 7/2024 | Shi | G09G 3/32 |
| 12,315,432 | B2 * | 5/2025 | Zhang | G09G 3/32 |
| 2007/0211165 | A1 * | 9/2007 | Yaguchi | H04N 23/71<br>348/E5.04 |
| 2015/0325170 | A1 * | 11/2015 | Jeon | G09G 5/02<br>345/77 |
| 2017/0263198 | A1 * | 9/2017 | Zhu | G09G 3/3607 |
| 2018/0267758 | A1 * | 9/2018 | Zhao | G09G 3/006 |
| 2024/0161452 | A1 * | 5/2024 | Huang | G06V 10/60 |

* cited by examiner

DISPLAY COMPENSATION METHOD AND SYSTEM FOR DISPLAY PANEL AND DISPLAY DEVICE

CROSS-REFERENCE TO RELATED APPLICATION

This application claims priority to and the benefit of Chinese Patent Application No. 202411134636.5, filed on Aug. 19, 2024, the disclosure of which is incorporated herein by reference in its entirety.

TECHNICAL FIELD

The present application relates to the field of display technology, and in particular to a display compensation method and system for a display panel and a display device.

BACKGROUND

When applying optical compensation algorithms to address non-uniformity issues in display images of display panels, it is a common practice to store only compensation data of partial grayscales to reduce computational complexity and storage requirements, while compensation data of remaining grayscales is obtained through interpolation and coefficient adjustment. However, compensation coefficients corresponding to sub-pixels of different luminous colors have an impact on the display panel's performance. Additionally, different display areas exhibit varying responses to the compensation coefficients, and different display panels respond differently to the same compensation coefficient. Consequently, establishing a model relating the compensation coefficients and the compensation effect becomes challenging. Manual adjustment of the compensation coefficients is inefficient and incapable of achieving optimal results. Alternatively, obtaining of the compensation coefficients by applying intelligent algorithms such as particle swarm optimization heavily relies on parameter settings. Improper parameter configurations may lead to slow convergence, susceptibility to local optima, or excessive oscillation, resulting in extended adjustment time and poor adjustment outcomes. Consequently, these issues hinder a practical application of such algorithms.

SUMMARY

Embodiments of the present disclosure provide a display compensation method and system for a display panel and a display device, which may adaptively adjust a compensation coefficient.

In an aspect, the present disclosure provides a display compensation method for a display panel, including: obtaining image data of a displayed image of the display panel when a first set of initial compensation coefficients is applied to control the display panel to display under a corresponding binding point grayscale; determining, based on the image data, whether a performance index of the displayed image satisfies a standard, and obtaining, in response to determining that the performance index of the displayed image does not satisfy the standard, a plurality of area evaluation values respectively corresponding to a plurality of display areas of the display panel based on average luminance and chrominance data corresponding to the display areas; obtaining a target area evaluation value based on the plurality of area evaluation values, and determining at least one of the plurality of display areas corresponding to the target area evaluation value as a target area in a target area set; and obtaining a target compensation coefficient corresponding to the target area in the target area set, and obtaining an output compensation coefficient based on the obtained target compensation coefficient, so as to apply the output compensation coefficient for the display panel to display.

In another aspect, the present disclosure provides a display compensation system for a display panel, including a display panel, a display driving module, an image acquisition module, a performance evaluation module, a coefficient adjustment module, and a storage module. The display driving module is electrically connected to the display panel. The display driving module is configured to apply a display compensation coefficient to control the display panel to display under a corresponding binding point grayscale, and the display compensation coefficient comprises a first set of initial compensation coefficients and an output compensation coefficient. The image acquisition module is configured to obtain image data of a displayed image of the display panel when the compensation coefficient is applied to control the display panel to display under the corresponding binding point grayscale. The performance evaluation module is electrically connected to the image acquisition module and configured to determine whether a performance index of the displayed image satisfies a standard based on the image data. The coefficient adjustment module is electrically connected to the performance evaluation module. When the performance evaluation module determines that the performance index of the displayed image does not satisfy the standard, the coefficient adjustment module is configured to obtain a plurality of area evaluation values respectively corresponding to a plurality of display areas of the display panel based on average luminance and chrominance data corresponding to the display areas, obtain a target area evaluation value based on the plurality of area evaluation values, determine at least one of the plurality of display area corresponding to the target area evaluation value as a target area in a target area set, and obtain the output compensation coefficient based on the target compensation coefficient corresponding to the target area included in the target area set. The storage module is electrically connected to the display driving module and the coefficient adjustment module. The storage module is configured to store output compensation coefficients corresponding to different binding point grayscales.

In still another aspect, the present disclosure provides a display device including a display panel and a display driving module. The display driving module is electrically connected to the display panel. The display driving module is configured to perform the display compensation method for the display panel as described above to obtain an output compensation coefficient and apply the output compensation coefficient to control the display panel to display.

BRIEF DESCRIPTION OF THE DRAWINGS

In order to more clearly illustrate the technical solutions in some embodiments of the present disclosure, the drawings needed for description of the embodiments will be briefly introduced below. Obviously, the drawings in the following description are only some embodiments of the present disclosure. For those skilled in the art, other drawings may also be obtained based on these drawings without exerting creative efforts.

DETAILED DESCRIPTION

Figure 1:
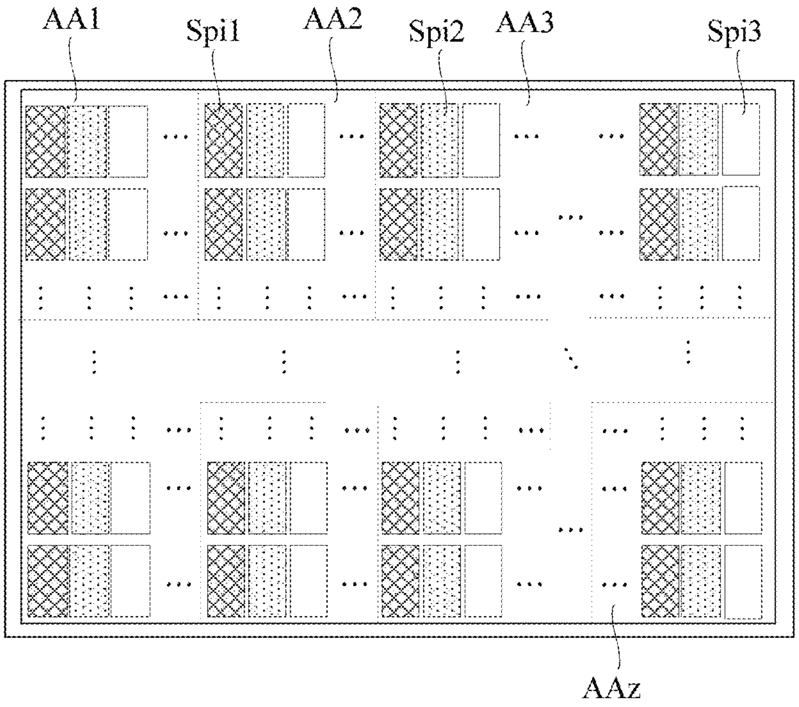
FIG. 1 is a schematic structural diagram of a display panel according to some embodiments of the present disclosure.

The technical solutions in some embodiments of the present disclosure will be clearly and completely described below with reference to the accompanying drawings relating to these embodiments. Obviously, the described embodiments are only some of the embodiments of the present disclosure, rather than all the embodiments. Based on the embodiments of the present disclosure, all other embodiments obtained by those skilled in the art without creative efforts shall fall within the scope of protection of the present disclosure. In addition, it should be understood that the specific embodiments described here are only used to illustrate and explain the present disclosure, and are not intended to limit the present disclosure. In the present disclosure, unless otherwise specified, the directional words used such as "upper" and "lower" usually refer to upper and lower positions of a device in actual use or in working conditions, specifically referring to the direction of a figure in the drawings; while "inside" and "outside" refer to an outline of the device.

Due to factors such as inconsistent manufacturing processes and varying responses of pixels, non-uniformity issues may occur to a displayed image of a display panel. In order to ensure that the display panel has a uniform display effect, an optical compensation algorithm is applied to analyze and compensate for luminance or color inconsistencies on the display panel.

The optical compensation algorithm is used to calculate a specific compensation value for each affected pixel or sub-pixel. The compensation value(s) is recorded in a memory (such as Electrically Erasable Programmable read only memory, EEPROM, electrically erasable programmable read-only memory) and applied in a driving signal of the display panel. Therefore, the compensation value(s) is applied during a real-time adjustment of each displayed image. Correspondingly, an actual display grayscale (denoted as Gray_real) of a pixel or a sub-pixel may be obtained according to a target display grayscale (denoted as Gray_tar) and a compensation value (denoted as Offset). That is, Gray_real=Gray_tar+Offset.

In order to reduce computational complexity and storage requirements, in actual use, it is a common practice to store only compensation data of some grayscales, while the compensation data corresponding to remaining grayscales are obtained through a compensation strategy of interpolation and coefficient adjustment. That is, Gray_real=Gray_tar+Offset_interpxGain, wherein Gray_real represents the actual display grayscale, Gray_tar represents the target display grayscale, Offset_interp represents an interpolation compensation value, and Gain represents a compensation coefficient.

However, a display effect of the display panel is affected by the compensation coefficients corresponding to the sub-pixels of different luminous colors, different areas exhibit varying responses to the compensation coefficients, and different display panels respond differently to a same set of compensation coefficients. Consequently, establishing a model relating the compensation coefficients and the compensation effect becomes challenging.

Manual adjustment of the compensation coefficients based on visual effects and experience is both inefficient and difficult to achieve optimal results. Besides, obtaining of the compensation coefficients by applying intelligent algorithms such as particle swarm optimization heavily relies on parameter settings. Improper parameter configurations may lead to slow convergence, susceptibility to local optima, or excessive oscillation, resulting in extended adjustment time and poor adjustment outcomes. Consequently, these issues hinder the practical application of such algorithms.

To this end, this application provides a display compensation method and system for a display panel and a display device to achieve adaptive adjustment of the compensation coefficient.

FIG. 1 is a schematic structural diagram of a display panel according to some embodiments of the present disclosure. FIGS. 2A to 2D are flow charts showing display compensation methods for a display panel according to some embodiments of the present disclosure. Some embodiments of the present disclosure provide some display compensation methods for and applied to a display panel. The display panel includes a plurality of display areas.

Figure 2A:
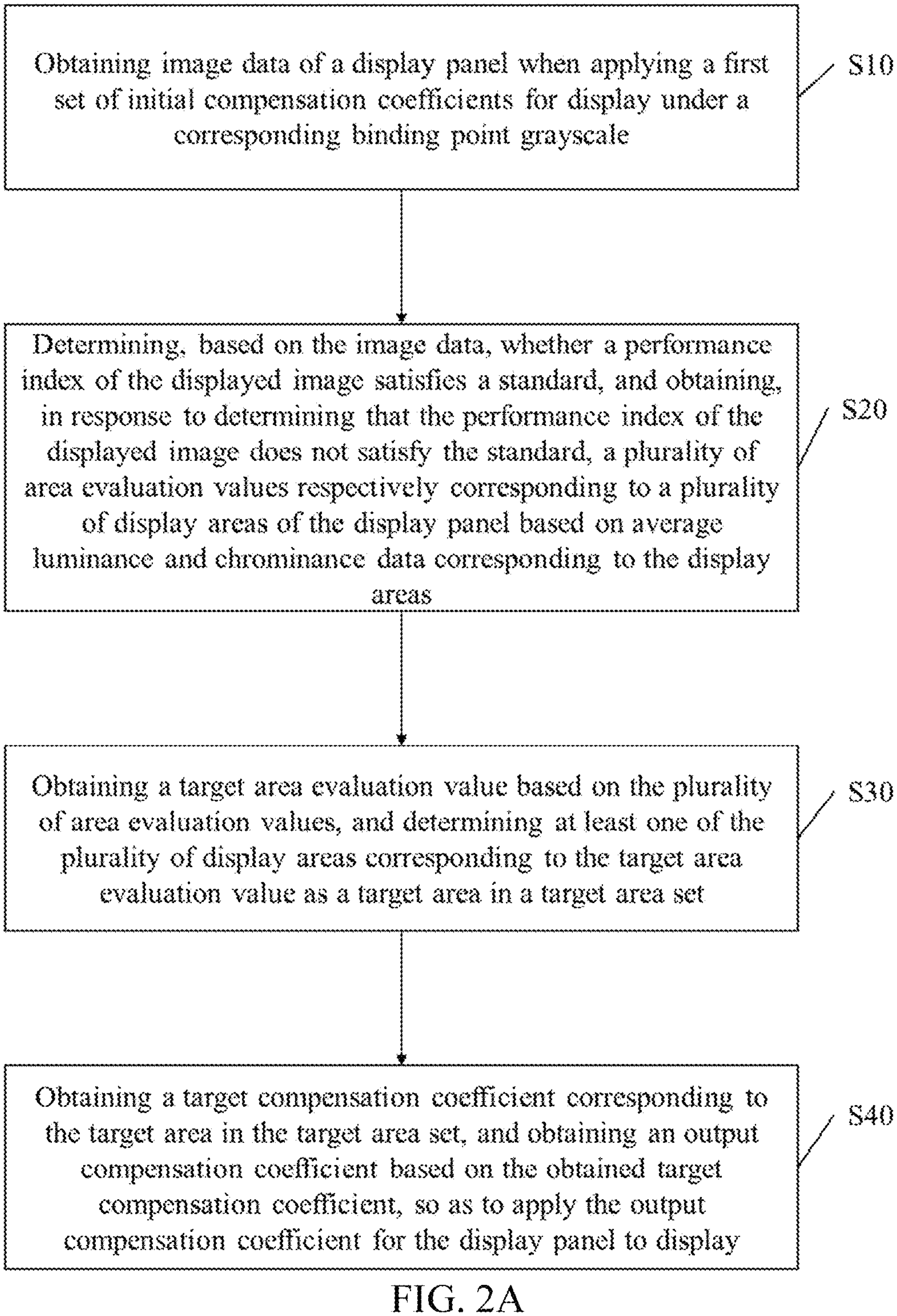
FIGS. 2A to 2D are flow charts showing display compensation methods for a display panel according to some embodiments of the present disclosure.

Please continue to refer to FIG. 2A, the display compensation method for the display panel include:

in S10, obtaining image data of a displayed image of the display panel when a first set of initial compensation coefficients is applied to control the display panel to display under a corresponding binding point grayscale;

in S20, determining, based on the image data, whether a performance index of a displayed image satisfies a standard, and obtaining, in response to determining that the performance index of the displayed image does not satisfy the standard, a plurality of area evaluation values respectively corresponding to a plurality of display areas of the display panel based on average luminance and chrominance data corresponding to the display areas;

in S30, obtaining a target area evaluation value based on the plurality of area evaluation values, and determining at least one of the plurality of display areas corresponding to the target area evaluation value as a target area in a target area set; and in S40, obtaining a target compensation coefficient corresponding to the target area in the target area set, and obtaining an output compensation coefficient based on the obtained target compensation coefficient, so as to apply the output compensation coefficient for the display panel to display.

Under the circumstance that the performance index of the displayed image obtained when the display panel applies the first set of initial compensation coefficients for display does not meet the standard, the plurality of area evaluation values and the target area evaluation value are obtained based on the average luminance and chrominance data respectively corresponding to the display areas of the display panel. Further, the display area corresponding to the target area evaluation value is determined as the target area in the target area set, so as to obtain the output compensation coefficient based on the target compensation coefficient corresponding to the target area in the target area set. In this way, the compensation coefficient applied to the display panel is changed to the output compensation coefficient from the first set of initial compensation coefficients, realizing the adaptive adjustment of the compensation coefficient. The output compensation coefficient may be used as the compensation coefficient Gain in the Equation: Gray_real=Gray_tar+Offset_interpxGain, and then is applied to the display of the display panel to achieve the display compensation of the display panel.

Optionally, in the operation S10, image data may be acquired through an image acquisition module. The image acquisition module may include a luminance and chrominance acquisition device, such as a high-precision color camera and a color analyzer.

Optionally, in the operation S10, image data of all pixels or all sub-pixels in the display panel may be collected to realize pixel-level or sub-pixel-level data collection. Alternatively, in the operation S10, the multiple pixels of the display panel may be partitioned to obtain the plurality of display areas, and image data of the various display areas may be collected to achieve non-pixel-level data collection.

Figure 3:
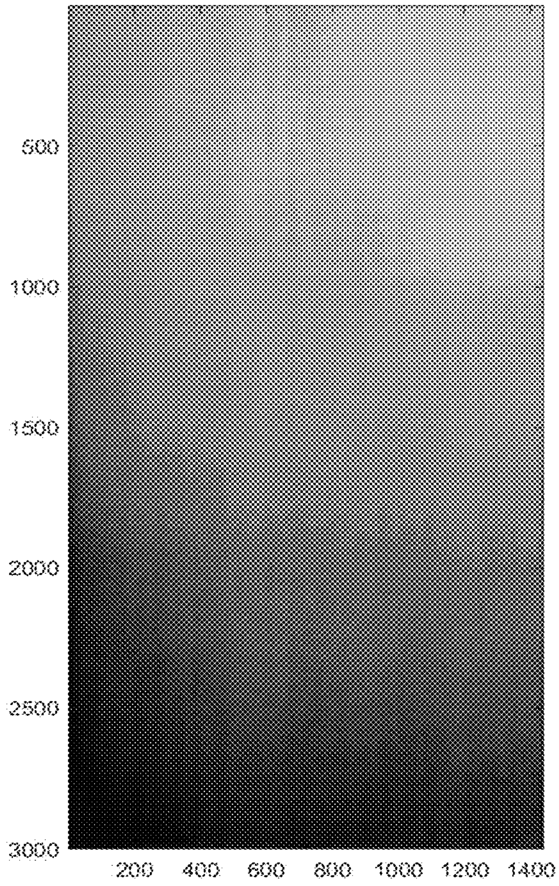
FIG. 3 is a schematic diagram showing collected luminance and chrominance data according to some embodiments of the present disclosure.

In the operation S10, the obtained image data may include luminance and chrominance data of the display panel, etc. As shown in FIG. 3, which is a schematic diagram showing collected luminance and chrominance data according to some embodiments of the present disclosure, the abscissa and the ordinate both represent a pixel coordinate system, and the luminance and chrominance data having a resolution of 1400*3000 may be collected according to the collected image data.

Optionally, in the operation S10, the binding point grayscale may be grayscale 0, grayscale 125, grayscale 255, etc. Correspondingly, one corresponding output compensation coefficient may be obtained for each binding point, so that a plurality of output compensation coefficients may be obtained for a plurality of binding points.

Optionally, the first set of initial compensation coefficients may include compensation sub-coefficients corresponding to sub-pixels of different luminous colors in the display panel. Please continue to refer to FIG. 1, the display panel includes a plurality of sub-pixels. The plurality of sub-pixels include a plurality of first sub-pixels Spi1, a plurality of second sub-pixels Spi2, and a plurality of third sub-pixels Spi3. A luminous color of the first sub-pixels Spi1, a luminous color of the second sub-pixels Spi2, and a luminous color of the third sub-pixels Spi3 are different. The first set of initial compensation coefficients include a first initial compensation sub-coefficient corresponding to the first sub-pixels Spi1, a second initial compensation sub-coefficient corresponding to the second sub-pixels Spi2, and a third initial compensation sub-coefficient corresponding to the third sub-pixels Spi3.

Optionally, the luminous colors of the first sub-pixels Spi1, the second sub-pixels Spi2, and the third sub-pixels Spi3 are red, green, and blue, respectively. Each pixel may include a first sub-pixel Spi1, a second sub-pixel Spi2, and a third sub-pixel Spi3.

Optionally, the first initial compensation sub-coefficient, the second initial compensation sub-coefficient, and the third initial compensation sub-coefficient may be equal or unequal.

Correspondingly, the target compensation coefficient and the output compensation coefficient may include compensation sub-coefficients corresponding to the sub-pixels of different luminous colors.

Alternatively, the first set of initial compensation coefficients may be set based on empirical values, or randomly selected from a compensation coefficient range. As described above, if the performance index of the displayed image obtained when the display panel applies the first set of initial compensation coefficients does not meet the standard, the output compensation coefficient that meets a performance index requirement will be determined accordingly. Therefore, the selection of the first set of initial compensation coefficients does not affect the obtained output compensation coefficient.

Figure 2B:
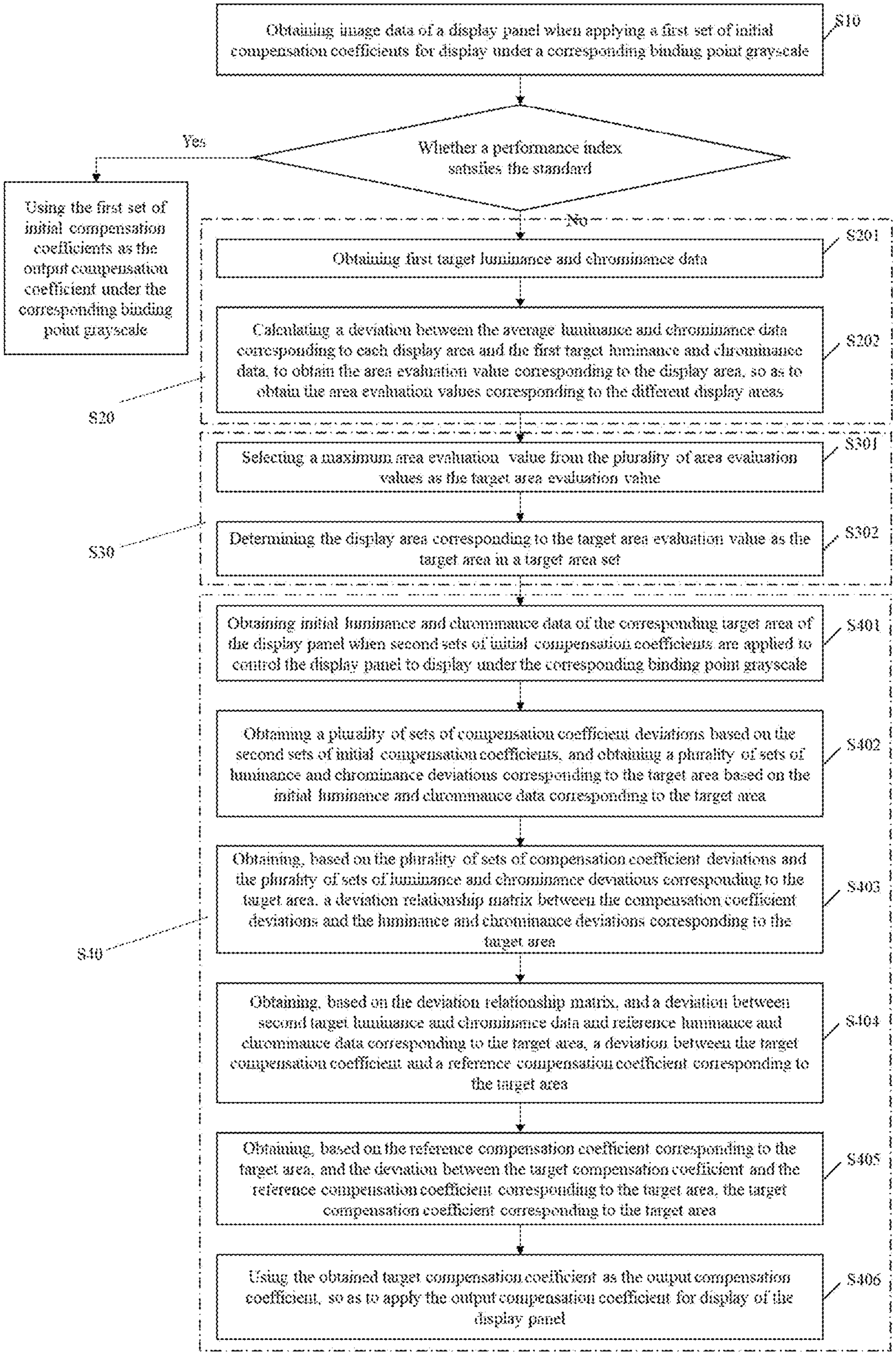

Please continue to refer to FIG. 2B. In the operation S20, whether the performance index of the displayed image satisfies the standard is determined based on the image data.

Optionally, a performance evaluation module may be used to determine whether the performance index of the displayed image satisfies the standard. As used herein, the standard may include a leaving factory standard, an empirical value, etc.

Figure 4:
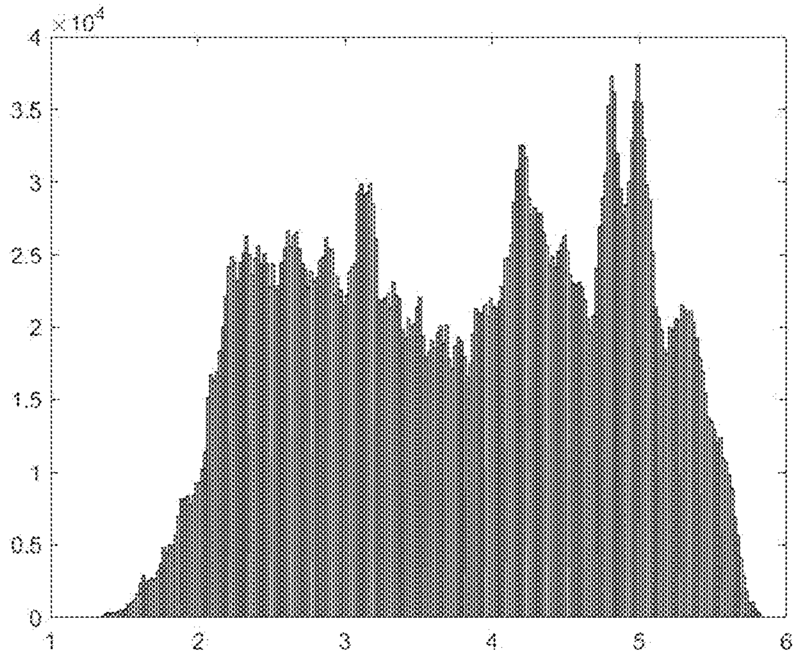
FIG. 4 is a luminance distribution histogram of a displayed image according to some embodiments of the present disclosure.

Optionally, the performance index of the displayed image includes luminance uniformity, color difference, display uniformity (that is, consistency of luminance and chrominance of various display areas of the display panel), and color accuracy (that is, a guaranteed matching degree between a displayed color and expected or standard color space), and other visual quality indicators. As shown in FIG. 4, which is a luminance distribution histogram of a displayed image according to some embodiments of the present disclosure, the abscissa represents luminance, and the ordinate represents the number of pixels. Based on the image data obtained in the operation S10, a luminance distribution of the displayed image may be obtained.

Optionally, in the process for determining whether the performance index of the displayed image meets the standard, a performance index corresponding to a central display area of the display panel may be used as a reference performance index, or a performance index corresponding to a pixel at the center of the display panel may be used as the reference performance index, and the performance indexes corresponding to other display areas may be compared with the reference performance index to determine whether an overall performance index of the display panel satisfies the standard.

Please continue to refer to FIG. 2B, in response to a determination that the performance index of the displayed image satisfies the standard based on the image data, the first set of initial compensation coefficients is used as the output compensation coefficient under the corresponding binding point grayscale. When the performance index of the displayed image does not satisfy the standard, the operation S20 is executed to obtain the plurality of area evaluation values, and then the target area evaluation value, the target area, the target compensation coefficient, and the output compensation coefficient are obtained based on the area evaluation values.

Please continue to refer to FIGS. 2A and 2B. In the operation S20, a coefficient adjustment module may be used to obtain the area evaluation values respectively corresponding to different display areas based on average luminance and chrominance data corresponding to the different display areas.

It should be noted that since the image data corresponding to the first set of initial compensation coefficients has been obtained in the operation S10, the image data may be directly read in the operation S20 to obtain the average luminance and chrominance data corresponding to each display area.

Optionally, the average luminance and chrominance data includes average luminance, average red-green chrominance, and average yellow-green chrominance.

In the operation S20, the display panel is divided into p×q display areas, and based on the average luminance and chrominance data corresponding to each display area, the area evaluation value corresponding to each display area may be obtained. In this case, $p>1$, and $q>1$.

Figure 5:
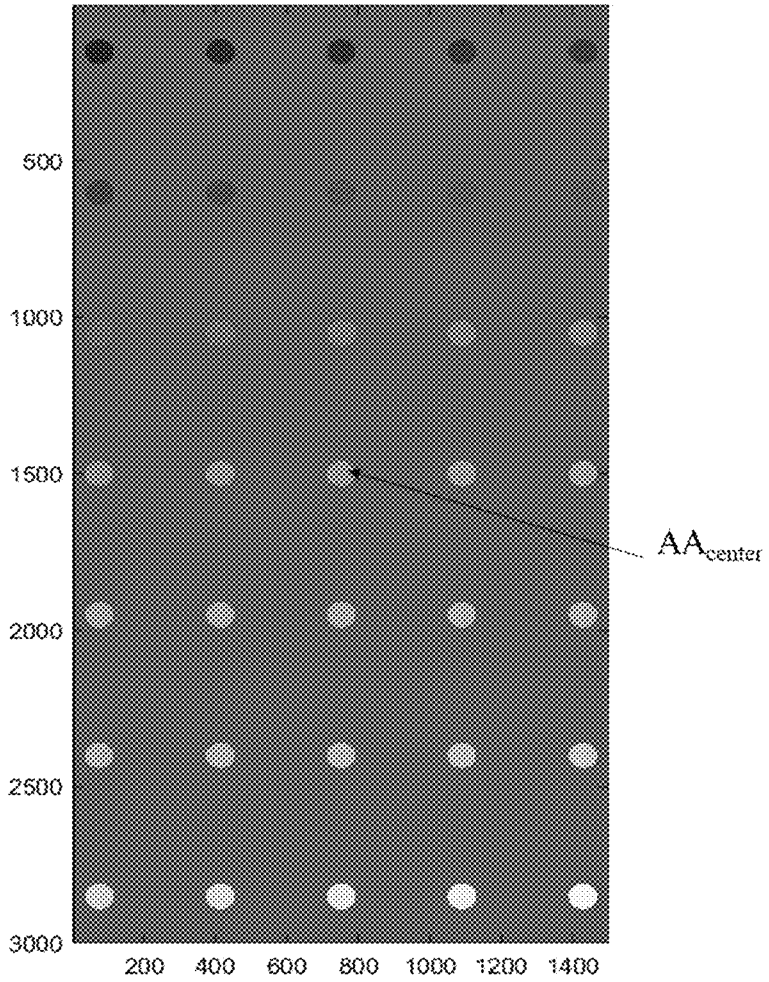
FIG. 5 is a schematic diagram showing luminance and chrominance data corresponding to different display areas according to some embodiments of the present disclosure.

As shown in FIG. 5, which is a schematic diagram showing luminance and chrominance data corresponding to different display areas according to some embodiments of the present disclosure, the abscissa and ordinate both represent a pixel coordinate system. The display panel includes 5×7 display areas, and each display area represented by a corresponding circle in FIG. 5 has its corresponding luminance and chrominance data, so that the area evaluation value corresponding to the display area is obtained based on the luminance and chrominance data corresponding to the display area.

It should be noted that the luminance and chrominance data corresponding to each display area may be represented as luminance and chrominance data corresponding to the sub-pixels or pixels included in the display area, or may also be represented as the average luminance and chrominance data corresponding to the display area. Based on the luminance and chrominance data corresponding to the sub-pixels or pixels included in each display area, the average luminance and chrominance data corresponding to each display area may be obtained.

Optionally, the area evaluation value corresponding to each display area may be obtained based on a deviation between the average luminance and chrominance data of the display area and first target luminance and chrominance data. Accordingly, please continue to refer to FIG. 2B. The operation S20 includes:

- in S201: obtaining, in response to determining that the performance index of the displayed image does not satisfy the standard, first target luminance and chrominance data; and
- in S202: calculating a deviation between the average luminance and chrominance data corresponding to each display area and the first target luminance and chrominance data, to obtain the area evaluation value corresponding to the display area, so as to obtain the area evaluation values corresponding to the different display areas.

Optionally, the area evaluation value includes a luminance difference, a red-green chrominance difference, and a yellow-blue chrominance difference.

Optionally, to enable the performance index of the displayed image corresponding to each display area to undergo a small adjustment range and reduce calculation complexity, the first target luminance and chrominance data may be the average luminance and chrominance data corresponding to the central display area of the display panel or the average luminance and chrominance data corresponding to the pixel at the center of the display panel. The first target luminance and chrominance data includes first target luminance, first target red-green chrominance, and first target yellow-green chrominance.

Optionally, after the operation S202, the color difference corresponding to each display area may be further calculated. For example, the color difference corresponding to each display area may be obtained according to ΔE1976, that is, $\Delta E=[(\Delta L^*)^2+(\Delta\alpha^*)^2+(\Delta b^*)^2]^{1/2}$, wherein the area evaluation value may include the color difference ΔE, $\Delta L^*$ represents the luminance difference, $\Delta a^*$ represents the red-green chrominance difference, and $\Delta b^*$ represents the yellow-blue chrominance difference.

After the area evaluation value corresponding to each display area is obtained, the display area that has the greatest impact on the display performance index may be determined based on the deviation of the average luminance and chrominance data corresponding to each display area and the first target luminance and chrominance data. Compensating the display area that has the greatest impact on the display performance index may effectively improve the performance index of the displayed image. Therefore, in the operation S30, by comparing the plurality of area evaluation values, the area with the largest deviation of average luminance and chrominance data from the first target luminance and chrominance data may be selected as the target area.

Accordingly, please continue to refer to FIGS. 2A to 2B, the operation S30 includes:

- in S301: selecting a maximum area evaluation value from the plurality of area evaluation values as the target area evaluation value; and
- in S302: determining the display area corresponding to the target area evaluation value as the target area in a target area set.

In the operation S30, the target area evaluation value and the target area are obtained based on the plurality of area evaluation values through the coefficient adjustment module.

After the corresponding target area is determined, in order to improve the performance index of a displayed image in the target area, it is necessary to obtain the compensation coefficient (i.e., the target compensation coefficient) corresponding to the target area. The target compensation coefficient corresponding to the target area may be obtained based on an impact of changes in the compensation coefficient on the luminance and chrominance data. That is, the changes in the compensation coefficient will cause changes in the luminance and chrominance data, which will then affect the performance index of the displayed image.

Correspondingly, please continue to refer to FIGS. 2A to 2B, in S40, the obtaining of the target compensation coefficient corresponding to the target area in the target area set includes:

- in S401: obtaining initial luminance and chrominance data of the corresponding target area of the display panel when second sets of initial compensation coefficients are applied to control the display panel to display under the corresponding binding point grayscale;
- in S402: obtaining a plurality of sets of compensation coefficient deviations based on the second sets of initial compensation coefficients, and obtaining a plurality of sets of luminance and chrominance deviations corresponding to the target area based on the initial luminance and chrominance data corresponding to the target area;

in S403: obtaining, based on the plurality of sets of compensation coefficient deviations and the plurality of sets of luminance and chrominance deviations corresponding to the target area, a deviation relationship matrix between the compensation coefficient deviations and the luminance and chrominance deviations corresponding to the target area;

in S404: obtaining, based on the deviation relationship matrix, and a deviation between second target luminance and chrominance data and reference luminance and chrominance data corresponding to the target area, a deviation between the target compensation coefficient and a reference compensation coefficient corresponding to the target area; and in S405: obtaining the target compensation coefficient corresponding to the target area based on the reference compensation coefficient corresponding to the target area, and the deviation between the target compensation coefficient and the reference compensation coefficient corresponding to the target area.

The corresponding binding point grayscale in S401 is the same as the corresponding binding point grayscale in S10, so that the output compensation coefficient obtained based on the target compensation coefficient corresponds to the binding point grayscale.

Optionally, the initial luminance and chrominance data includes initial luminance, initial red-green chrominance, and initial yellow-blue chrominance. Optionally, the initial luminance and chrominance data corresponding to the target area may be average initial luminance and chrominance data.

Optionally, the first set of initial compensation coefficients may be or may not be used as one set of the second sets of initial compensation coefficients.

When the first set of initial compensation coefficients is used as one set of the second sets of initial compensation coefficients, the initial luminance and chrominance data corresponding to the target area may be obtained based on the image data in the operation S10. When the display panel applies other second sets of initial compensation coefficients to display, the image acquisition module may be used to obtain the initial luminance and chrominance data of the corresponding target area.

Optionally, each second set of initial compensation coefficients may include a first initial compensation sub-coefficient corresponding to the first sub-pixels Spi1, a second initial compensation sub-coefficient corresponding to the second sub-pixels Spi2, and a third initial compensation sub-coefficient corresponding to the third sub-pixels Spi3.

Optionally, the first initial compensation sub-coefficient, the second initial compensation sub-coefficient, and the third initial compensation sub-coefficient of a same second set of initial compensation coefficients may be the same or different. Among a pair of first initial compensation sub-coefficients, a pair of second initial compensation sub-coefficients, and a pair of third initial compensation sub-coefficients included in two second sets of initial compensation coefficients, at least one pair of these three pairs has different initial compensation sub-coefficients so that the two second sets of initial compensation coefficients are different, thereby reflecting changes of the second set of initial compensation coefficients.

Optionally, each of the first initial compensation sub-coefficient, the second initial compensation sub-coefficient, and the third initial compensation sub-coefficient in various second sets of initial compensation coefficients may change in a unit step size, which results in the differences between the second sets of initial compensation coefficients to reflect the impact of the change of one unit step size in each of the first initial compensation sub-coefficient, the second initial compensation sub-coefficient, and the third initial compensation sub-coefficient on the initial luminance and chrominance data. The unit step size may vary according to different needs.

Optionally, the second set(s) of initial compensation coefficients may be set empirically.

In order to make color performance displayed by the display panel, based on the output compensation coefficient, close to visual experience of a human eye, the luminance and chrominance data may be converted into Lab space (i.e., Lab color space, opponent color space) to obtain the initial luminance and chrominance data corresponding to the various display areas, thereby obtaining the deviation relationship matrix and the target compensation coefficient based on the second sets of initial compensation coefficients and the initial luminance and chrominance data corresponding to the target area.

Figure 2C:
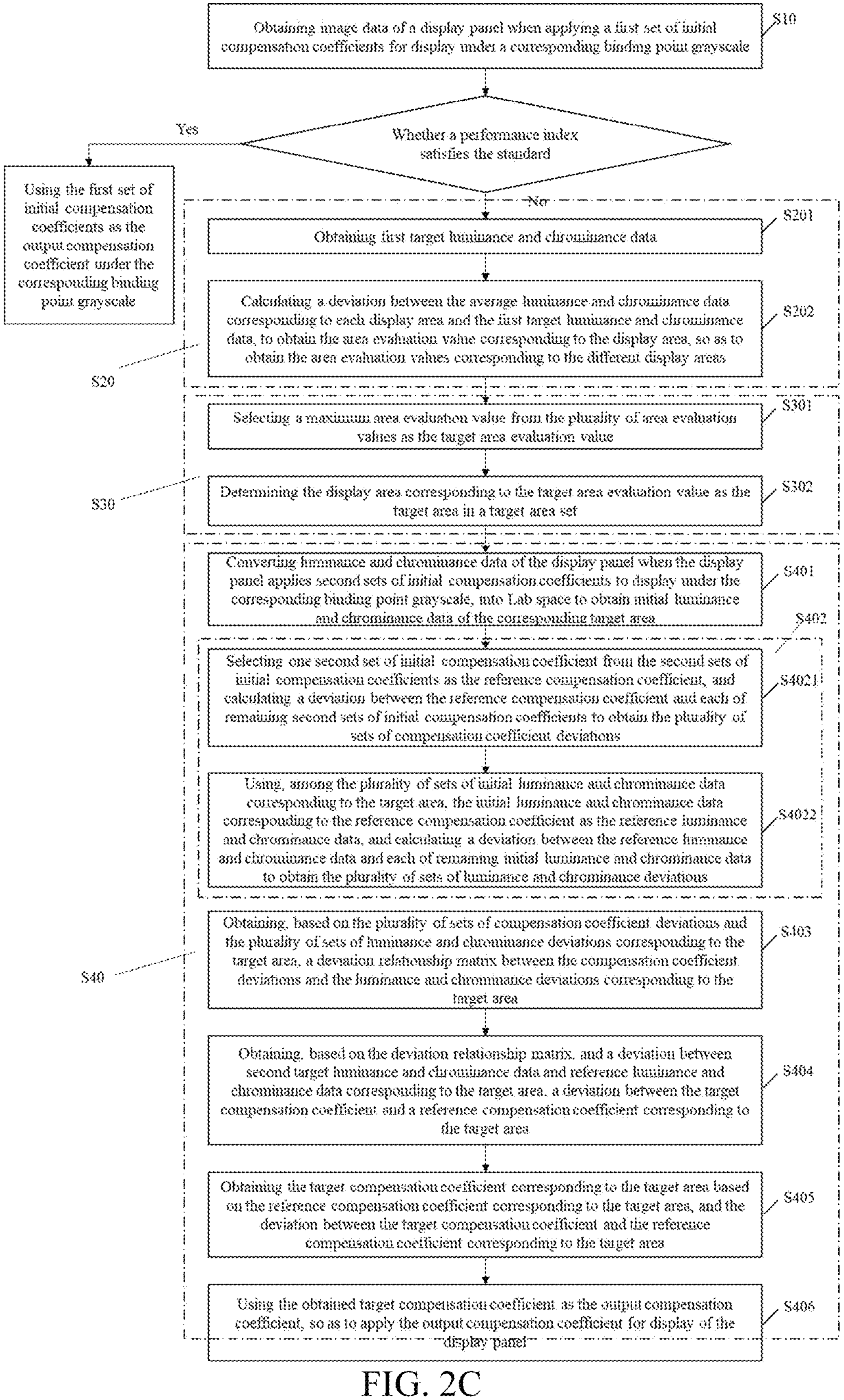

Correspondingly, please continue to refer to FIG. 2C, the operation S401 includes: converting luminance and chrominance data of the display panel, when it applies the second sets of initial compensation coefficients to display under the corresponding binding point grayscale, into Lab space to obtain the initial luminance and chrominance data corresponding to the target area.

Optionally, the operations S402 to S405 may be executed through a data processing module to obtain the plurality of sets of compensation coefficient deviations, the plurality of sets of luminance and chrominance deviations, the deviation relationship matrix (denoted as M), and the target compensation coefficient.

Since the second sets of initial compensation coefficients are different, the plurality of sets of compensation coefficient deviations may be obtained by calculating differences between the second sets of initial compensation coefficients, thereby obtaining changes in the second sets of initial compensation coefficients. Correspondingly, the plurality of sets of luminance and chrominance deviations are obtained by calculating differences between a plurality of initial luminance and chrominance data, thereby obtaining changes in the plurality of initial luminance and chrominance data.

One second set of initial compensation coefficients may be selected from the second sets of initial compensation coefficients as the reference compensation coefficient to obtain the deviations of the remaining second sets of initial compensation coefficients relative to the reference compensation coefficient. The initial luminance and chrominance data corresponding to the reference compensation coefficient may be selected from the plurality of initial luminance and chrominance data as the reference luminance and chrominance data, so as to obtain the deviations of the remaining initial luminance and chrominance data relative to the reference luminance and chrominance data. In this way, a variation shown in the initial luminance and chrominance data, when the second sets of initial compensation coefficients vary, is obtained.

Accordingly, please continue to refer to FIG. 2C, the operation S402 includes:

in S4021: selecting one second set of initial compensation coefficient from the second sets of initial compensation coefficients as the reference compensation coefficient, and calculating a deviation between the reference compensation coefficient and each of remaining second sets of initial compensation coefficients to obtain the plurality of sets of compensation coefficient deviations; and in S4022: using, among the plurality of sets of initial luminance and chrominance data corresponding to the target area, the initial luminance and chrominance data corresponding to the reference compensation coefficient as the reference luminance and chrominance data, and calculating a deviation between the reference luminance and chrominance data and each of remaining initial luminance and chrominance data to obtain the plurality of sets of luminance and chrominance deviations.

Optionally, in S4021, when the first set of initial compensation coefficients is used as one set of the second sets of initial compensation coefficients, the first set of initial compensation coefficients may be used as the reference compensation coefficient to improve the display performance index based on the first set of initial compensation coefficients, which reducing calculation operations, shortening compensation coefficient adjustment time, and optimizing the output compensation coefficient. If in multiple display panels produced in a same batch, the output compensation coefficient (for brevity, referred to as a first output compensation coefficient) correspondingly used by a first display panel is the first set of initial compensation coefficients correspondingly used by a second display panel, it is possible, since the first output compensation coefficient has reflected an improvement of the display performance index, to use the first output compensation coefficient as the first set of initial compensation coefficients of the second display panel, while choosing the first set of compensation coefficients as the reference compensation coefficient, and hence variations of the remaining second sets of initial compensation coefficients relative to the first output compensation coefficient are obtained, so as to obtain variations in luminance and chrominance data corresponding to the variations of the remaining second sets of initial compensation coefficients. In this way, the output compensation coefficient obtained based on the first output compensation coefficient essentially further optimizes the first output compensation coefficient. In other words, the output compensation coefficient corresponding to the second display panel is obtained through fine-tuning of the output compensation coefficient corresponding to the first display panel. Therefore, in the obtaining of the output compensation coefficient correspondingly used by one display panel based on the output compensation coefficient correspondingly used by another display panel, the correspondingly used first set of initial compensation coefficients is the output compensation coefficient correspondingly used by the another display panel. According to the display compensation method provided by the embodiments of the present disclosure, the corresponding output compensation coefficient may be obtained fast, thereby improving the adjustment efficiency of the compensation coefficient.

Optionally, in the operation S402, u−1 compensation coefficient deviations may be obtained based on u second sets of initial compensation coefficients, and v−1 luminance and chrominance deviations may be obtained based on v initial luminance and chrominance data, where u>1, v>1.

In the operation S403, the deviation relationship matrix is obtained according to the following formula:

$$(\text{Gain\_all}-\text{Gain\_end})\times M=\text{Meas\_all}-\text{Meas\_end},$$

where M represents the deviation relationship matrix, Gain_all represents the second sets of initial compensation coefficients, Gain_end represents the reference compensation coefficient corresponding to the target area, Meas_all represents the plurality of sets of initial luminance and chrominance data, and Meas_end represents the reference luminance and chrominance data.

The deviation relationship matrix represents the impact of changes in the first initial compensation sub-coefficients, the second initial compensation sub-coefficients, and the third initial compensation sub-coefficients in the second sets of initial compensation coefficients on the initial luminance and chrominance data. A process of solving the deviation relationship matrix corresponds to a process of solving an overdetermined system of equations. The deviation relationship matrix is obtained by solving the least square solution of the overdetermined system.

In the operation S404, the deviation between the target compensation coefficient and the reference compensation coefficient corresponding to the target area is obtained according to the following formula:

$$(\text{Gain\_tar}-\text{Gain\_end})\times M=\text{Meas\_tar}-\text{Meas\_end},$$

where Gain_tar represents the target compensation coefficient, Gain_end represents the reference compensation coefficient corresponding to the target area, M represents the deviation relationship matrix, Meas_tar represents the second target luminance and chrominance data, and Meas_end represents the reference luminance and chrominance data. A process of solving the deviation between the target compensation coefficient and the reference compensation coefficient corresponding to the target area corresponds to a process of solving a homogeneous equation system.

Optionally, in order to reduce computational complexity, the second target luminance and chrominance data is the initial luminance and chrominance data corresponding to the central display area of the display panel when the reference compensation coefficient is applied to control the display panel to display.

After obtaining the deviation between the target compensation coefficient and the reference compensation coefficient corresponding to the target area, the target compensation coefficient corresponding to the target area may be directly calculated. Correspondingly, please continue to refer to FIG. 2C, the operation S405 includes: calculating a sum of the deviation between the target compensation coefficient and the reference compensation coefficient corresponding to the target area and the reference compensation coefficient to obtain the target compensation coefficient.

Since the target area corresponding to the target compensation coefficient is the display area that has the greatest impact on the display performance index, applying the target compensation coefficient corresponding to the target area directly to the display of the display panel may improve the display performance index. Correspondingly, please continue to refer to FIG. 2C. In the operation S40, the obtaining of the output compensation coefficient based on the obtained target compensation coefficient so as to apply the output compensation coefficient to display of the display panel includes:

in S406: using the obtained target compensation coefficient as the output compensation coefficient, so as to apply the output compensation coefficient for display of the display panel.

Optionally, in order to shorten the compensation coefficient adjustment time, when used to display, the first set of initial compensation coefficients and output compensation coefficient may be used by multiple display areas simultaneously. That is, it is no longer necessary to set different first sets of initial compensation coefficients and different output compensation coefficients for different display areas.

Next, with reference to FIG. 1, FIG. 2A to FIG. 2C, and FIG. 5, the display compensation method will be described by taking the following as an example: the p×q display areas include a first area AA1, a second area AA2, a third area AA3, . . . , a $z^{th}$ area AAz, the p×q display areas include a central display area (i.e., a display area $AA_{center}$ which is located in the center of the p×q display areas as shown in FIG. 5), and z>3.

In the operation S10, when the display panel applies the first set of initial compensation coefficients G1 to display under the corresponding binding point grayscale, the first initial compensation sub-coefficient corresponding to the first sub-pixels Spi1 in various display areas is Gain_R_0, the second initial compensation sub-coefficient corresponding to the second sub-pixels Spi2*t* in various display areas is Gain_G_0, and the third initial compensation sub-coefficient corresponding to the third sub-pixels Spi3 in various display areas is Gain_B_0. The first set of initial compensation coefficients G1 is denoted as G1=[Gain_R_0, Gain_G_0, Gain_B_0].

The performance index corresponding to the central display area of the display panel is used as the reference performance index to be compared with the performance indexes corresponding to other display areas, thereby obtaining a determination result as to whether the overall performance index of the display panel satisfies the standard.

When the performance index of the displayed image satisfies the standard, the first set of initial compensation coefficients G1 is used as the output compensation coefficient under the corresponding binding point grayscale.

In the operation S201, when the performance index of the displayed image does not satisfy the standard, the average luminance and chrominance data corresponding to the central display area of the display panel is used as the first target luminance and chrominance data. The average luminance and chrominance data corresponding to the central display area includes average chrominance L_0_tar, average red-green chrominance a_0_tar, and average yellow-blue chrominance b_0_tar. That is, the corresponding first target luminance and chrominance data includes the first target luminance L_0_tar, the first target red-green chrominance a_0_tar, and the first yellow-blue chrominance b_0_tar. The first target luminance and chrominance data Meas_tar1 is denoted as Meas_tar1=[L_0_tar, a_0_tar, b_0_tar].

While the average luminance and chrominance data corresponding to the central display area of the display panel is obtained, the average luminance and chrominance data corresponding to other display areas may be obtained. For example, the average luminance and chrominance data corresponding to the first area AA1 includes average luminance L_0_0, average red-green chrominance a_0_0, and average yellow-blue chrominance b_0_0. The luminance and chrominance data Meas_0 corresponding to the first area AA1 is denoted as Meas_0=[L_0_0, a_0_0, b_0_0]. The average luminance and chrominance data corresponding to the second area AA2 includes average luminance L_0_1, average red-green chrominance a_0_1, and average yellow-blue chrominance b_0_1. The luminance and chrominance data Meas_1 corresponding to the second area AA2 is denoted as Meas_1=[L_0_1, a_0_1, b_0_1]. The average luminance and chrominance data corresponding to the third area AA3 includes average luminance L_0_2, average red-green chrominance a_0_2, and average yellow-blue chrominance b_0_2. The average luminance and chrominance data Meas_3 corresponding to the third area AA3 is denoted as Meas_3=[L_0_2, a_0_2, b_0_2]. By analogy, the average luminance and chrominance data corresponding to the $z^{th}$ area AAz includes average luminance L_0_(z−1), average red-green chrominance a_0_(z−1), and average yellow-blue chrominance b_0_(z−1). The luminance and chrominance data Meas_(z−1) corresponding to $z^{th}$ area AAz is denoted as Meas_(z−1)=[L_0_(z−1), a_0_(z−1), b_0_(z−1)].

In the operation S202, an area evaluation value Cost corresponding to each display area AA includes a luminance difference, a red-green chrominance difference, and a yellow-blue chrominance difference. Correspondingly, a deviation Meas_tar1−Meas_0 between the luminance and chrominance data Meas_0 corresponding to the first area AA1 and the first target luminance and chrominance data Meas_tar1 is an area evaluation value Cost_0_0 corresponding to the first area AA1. That is, Meas_tar1-Meas_0=Cost_0_0=[L_0_tar-L_0_0, a_0_tar-a_0_0, b_0_tar-b_0_0], where L_0_tar-L_0_0 corresponds to the luminance difference of the first area AA1 from the central display area, a_0_tar-a_0_0 corresponds to the red-green chrominance difference of the first area AA1 from the central display area, b_0_tar-b_0_0 corresponds to the yellow-blue chrominance difference of the first area AA1 from the central display area.

Similarly, a deviation Meas_tar1-Meas_1 between the luminance and chrominance data Meas_1 corresponding to the second area AA2 and the first target luminance and chrominance data Meas_tar1 is an area evaluation value Cost_0_1 corresponding to the second area AA2. That is, Meas_tar1-Meas_1=Cost_0_1=[L_0_tar-L_0_1, a_0_tar-a_0_1, b_0_tar-b_0_1]. A deviation Meas_tar1-Meas_2 between the luminance and chrominance data Meas_2 corresponding to the third area AA3 and the first target luminance and chrominance data Meas_tar1 is an area evaluation value Cost_0_2 corresponding to the third area AA3. That is, Meas_tar1-Meas_2=Cost_0_2=[L_0_tar-L_0_2, a_0_tar-a_0_2, b_0_tar-b_0_2]. By analogy, a deviation Meas_tar1-Meas_(z−1) between the luminance and chrominance data Meas_(z−1) corresponding to the $z^{th}$ area AAz and the first target luminance and chrominance data Meas_tar1 is an area evaluation value Cost_0_(z−1) corresponding to the $z^{th}$ area AAz. That is, Meas_tar1-Meas_(z−1)=Cost_0_(z−1)==[L_0_tar−L_0_(z−1), a_0_tar−a_0_(z−1), b_0_tar−b_0_(z−1)].

In the operation S30, among the plurality of area evaluation values, the maximum area evaluation value may be obtained accordingly. If the area evaluation value Cost_0_0 corresponding to the first area AA1 is the maximum area evaluation value, the area evaluation value Cost_0_0 corresponding to the first area AA1 is determined as the target area evaluation value Cost_0_tar. Correspondingly, the first area AA1 serves as the target area in the target area set denoted as L<P>. At this time, there is only one target area (i.e., the first area AA1) in the target area set L<P>.

In order to obtain the target compensation coefficient corresponding to the target area in the target area set L<P>, the compensation coefficient applied to the display panel is adjusted.

That is, in the operation S401, the second sets of initial compensation coefficients are applied to control the display panel to display. For example, the plurality of second sets of compensation coefficients include a first second set of compensation coefficients G21, a second second set of compensation coefficients G22, a third second set of compensation coefficients G23, and a fourth second set of compensation coefficients G24. In the first second set of compensation coefficients G21, the first initial compensation sub-coefficient is Gain_0, the second initial compensation sub-coefficient is Gain_0, and the third initial compensation sub-coefficient is Gain_0. The first second set of compensation coefficients G21 is denoted as G21=[Gain_0, Gain_0, Gain_0]. In the second second set of compensation coefficients G22, the first initial compensation sub-coefficient is Gain_1, the second initial compensation sub-coefficient is Gain_0, and the third initial compensation sub-coefficient is Gain_0. The second second set of compensation coefficients G22 is denoted as G22=[Gain_1, Gain_0, Gain_0]. In the third second set of compensation coefficients G23, the first initial compensation sub-coefficient is Gain_0, the second initial compensation sub-coefficient is Gain_2, and the third initial compensation sub-coefficient is Gain_0. The third second set of compensation coefficients G23 is denoted as G23=[Gain_0, Gain_2, Gain_0]. In the fourth second set of compensation coefficients G24, the first initial compensation sub-coefficient is Gain_0, the second initial compensation sub-coefficient is Gain_0, and the third initial compensation sub-coefficient is Gain_3. The fourth second set of compensation coefficients G24 is denoted as G24=[Gain_0, Gain_0, Gain_3]. Correspondingly, the second sets of initial compensation coefficients Gain_all may be denoted as follows:

$$\text{Gain\_all} = \begin{bmatrix} G21 \\ G22 \\ G23 \\ G24 \end{bmatrix} = \begin{bmatrix} \text{Gain\_0} & \text{Gain\_0} & \text{Gain\_0} \\ \text{Gain\_1} & \text{Gain\_0} & \text{Gain\_0} \\ \text{Gain\_0} & \text{Gain\_2} & \text{Gain\_0} \\ \text{Gain\_0} & \text{Gain\_0} & \text{Gain\_3} \end{bmatrix}.$$

The second second set of compensation coefficients G22 differs from the first second set of compensation coefficients G21 only in the first initial compensation sub-coefficient, that is, only the first initial compensation sub-coefficient changes and the change may be of one unit step size. The third second set of compensation coefficients G23 differs from the first second set of compensation coefficients G21 only in the second initial compensation sub-coefficient, that is, only the second initial compensation sub-coefficient changes and the change may be of one unit step size. The fourth second set of compensation coefficients G24 differs from the first second set of compensation coefficients G21 only in the third initial compensation sub-coefficient, that is, only the third initial compensation sub-coefficient changes and the change may be of one unit step size. When the display panel applies the first second set of initial compensation coefficients G21 to display, the first initial compensation sub-coefficient corresponding to each display area is Gain_0, the second initial compensation sub-coefficient corresponding to each display area is Gain_0, and the third initial compensation sub-coefficient corresponding to each display area is Gain_0. Similarly, when the display panel applies the second second set of initial compensation coefficients G22 to the fourth second set of initial compensation coefficients G24 to display, the first initial compensation sub-coefficient, the second initial compensation sub-coefficient, and the third initial compensation sub-coefficient corresponding to each display area may be obtained.

By converting the luminance and chrominance data of the display panel, when the display panel applies the second sets of initial compensation coefficients to display, into the Lab space, the initial luminance and chrominance data of the corresponding target area is obtained, including first initial luminance and chrominance data lab1, second initial luminance and chrominance data lab2, third luminance and chrominance data lab3, and fourth initial luminance and chrominance data lab4. That is, by converting the luminance and chrominance data of the display panel when applying the first second set of initial compensation coefficients G21 for display into the Lab space, the first initial luminance and chrominance data lab1 corresponding to the target area is obtained. The first initial luminance and chrominance data lab1 includes initial luminance L*_0, initial red-green chrominance a*_0, and initial yellow-blue chrominance b*_0, and the first initial luminance data lab1 is recorded as lab1=[L*_0, a*_0, b*_0]. By converting the luminance and chrominance data of the display panel when applying the second second set of initial compensation coefficients G22 for display into the Lab space, the second initial luminance and chrominance data lab2 corresponding to the target area is obtained. The second initial luminance and chrominance data lab2 includes initial luminance L*_1, initial red-green chrominance a*_1, and initial yellow-blue chrominance b*_1, and the second initial luminance data lab2 is recorded as lab2=[L*_1, a*_1, b*_1]. By converting the luminance and chrominance data of the display panel when applying the third second set of initial compensation coefficients G23 for display into the Lab space, the third initial luminance and chrominance data lab3 corresponding to the target area is obtained. The third initial luminance and chrominance data lab3 includes initial luminance L*_2, initial red-green chrominance a*_2, and initial yellow-blue chrominance b*_2, and the third initial luminance data lab3 is recorded as lab3=[L*_2, a*_2, b*_2]. By converting the luminance and chrominance data of the display panel when applying the fourth second set of initial compensation coefficient G24 for display into the Lab space, the fourth initial luminance and chrominance data lab4 corresponding to the target area is obtained. The fourth initial luminance and chrominance data lab4 includes initial luminance L*_3, initial red-green chrominance a*_3, and initial yellow-blue chrominance b*_3, and the fourth initial luminance data lab4 is recorded as lab4=[L*_3, a*_3, b*_3]. Correspondingly, the plurality of sets of initial luminance and chrominance data Meas_all may be denoted as follows:

$$\text{Meas\_all} = \begin{bmatrix} \text{lab1} \\ \text{lab2} \\ \text{lab3} \\ \text{lab4} \end{bmatrix} = \begin{bmatrix} L*\_0 & a*\_0 & b*\_0 \\ L*\_1 & a*\_1 & b*\_1 \\ L*\_2 & a*\_2 & b*\_2 \\ L*\_3 & a*\_3 & b*\_3 \end{bmatrix}.$$

In the operation S4021, the first second set of initial compensation coefficients G21 may be used as the reference compensation coefficient Gain_end of the target area (i.e., the first area AA1), and the deviation between the reference compensation coefficient Gain_end and each of the remaining second sets of initial compensation coefficients (e.g., the second second set of initial compensation coefficients G22 to the fourth second set of initial compensation coefficients G24) is obtained, thus obtaining the plurality of sets of compensation coefficient deviation as below:

$$\text{Gain\_all} - \text{Gain\_end} = \begin{bmatrix} \text{Gain\_1} - \text{Gain\_0} & \text{Gain\_0} - \text{Gain\_0} & \text{Gain\_0} - \text{Gain\_0} \\ \text{Gain\_0} - \text{Gain\_0} & \text{Gain\_2} - \text{Gain\_0} & \text{Gain\_0} - \text{Gain\_0} \\ \text{Gain\_0} - \text{Gain\_0} & \text{Gain\_0} - \text{Gain\_0} & \text{Gain\_3} - \text{Gain\_0} \end{bmatrix}.$$

Correspondingly, in the operation S4022, the initial luminance and chrominance data corresponding to the reference compensation coefficient Gain_end (i.e., the first initial luminance and chrominance data lab1) is used as the reference luminance and chrominance data Meas_end, and a deviation between the reference luminance and chrominance data Meas_end and each of the remaining initial luminance and chrominance data (i.e., the second initial luminance and chrominance data lab2 to the fourth initial luminance and chrominance data lab4) is obtained, thus obtaining the plurality of sets of luminance and chrominance deviations as below:

$$\text{Meas\_all-Meas\_end} = \begin{bmatrix} L*\_1\text{-}L*\_0 & a*\_1\text{-}a*\_0 & b*\_1\text{-}b*\_0 \\ L*\_2\text{-}L*\_0 & a*\_2\text{-}a*\_0 & b*\_2\text{-}b*\_0 \\ L*\_3\text{-}L*\_0 & a*\_3\text{-}a*\_0 & b*\_1\text{-}b*\_0 \end{bmatrix}.$$

Thus, in the operation S403, the following formula may be obtained based on the formula (Gain_all−Gain_end)× M=Meas_all−Meas_end:

$$\begin{bmatrix} \text{Gain\_1-Gain\_0} & \text{Gain\_0-Gain\_0} & \text{Gain\_0-Gain\_0} \\ \text{Gain\_0-Gain\_0} & \text{Gain\_2-Gain\_0} & \text{Gain\_0-Gain\_0} \\ \text{Gain\_0-Gain\_0} & \text{Gain\_0-Gain\_0} & \text{Gain\_3-Gain\_0} \end{bmatrix} \times$$

$$M = \begin{bmatrix} L*\_1\text{-}L*\_0 & a*\_1\text{-}a*\_0 & b*\_1\text{-}b*\_0 \\ L*\_2\text{-}L*\_0 & a*\_2\text{-}a*\_0 & b*\_2\text{-}b*\_0 \\ L*\_3\text{-}L*\_0 & a*\_3\text{-}a*\_0 & b*\_1\text{-}b*\_0 \end{bmatrix} =$$

$$\begin{bmatrix} \Delta\text{Gain0} & 0 & 0 \\ 0 & \Delta\text{Gain1} & 0 \\ 0 & 0 & \Delta\text{Gain2} \end{bmatrix} \times M = \begin{bmatrix} \Delta L*0 & \Delta a*0 & \Delta b*0 \\ \Delta L*1 & \Delta a*1 & \Delta b*1 \\ \Delta L*2 & \Delta a*2 & \Delta b*2 \end{bmatrix}.$$

Then, the deviation relationship matrix M may be obtained. It should be noted that in order to make the formula (Gain_all−Gain_end)*M=Meas_all−Meas_end solvable, a rank of the matrix in the formula (Gain_all−Gain_end)*M=Meas_all−Meas_end must be greater than or equal to 3.

In the operation S404, if the initial luminance and chrominance data corresponding to the central display area of the display panel is the second target luminance and chrominance data when the display panel applies the reference compensation coefficient Gain_end for display, the luminance and chrominance data of the display panel when applying the reference compensation coefficient Gain_end (i.e., the first second set of initial compensation coefficients G21) for display is converted into the Lab space, to obtain initial luminance and chrominance data lab_tar21 corresponding to the center display area, which includes initial luminance L*_0_tar2, initial red and green chrominance a*_0_tar2, and initial yellow-blue chrominance b*_0_tar2, and is denoted as lab_tar21=[L*_0_tar2, a*_0_tar2, b*_0_tar2]. Correspondingly, after the deviation relationship matrix M is obtained, the following formula may be obtained according to the formula (Gain_tar−Gain_end)× M=Meas_tar−Meas_end:

$$(\text{Gain\_tar-Gain\_end}) \times M = \text{Meas\_tar-}$$

$$\text{Meas\_end} = [L*\_0\_\text{tar2-}L*\_0 \quad a*\_0\_\text{tar2-}a*\_0 \quad b*\_0\_\text{tar2-}b*\_0].$$

Therefore, the deviation (i.e., Gain_tar−Gain_end) between the target compensation coefficient Gain_tar and the reference compensation coefficient Gain_end corresponding to the target area may be obtained.

By calculating a sum of the deviation between the target compensation coefficient Gain_tar and the reference compensation coefficient Gain_end corresponding to the target area and the reference compensation coefficient Gain_end, the target compensation coefficient Gain_tar of the corresponding target area (i.e., the first area AA1) may be obtained, that is, Gain_tar=(Gain_tar−Gain_end)+ Gain_end.

Afterwards, in the corresponding operation S406, the target compensation coefficient may be used as the output compensation coefficient under the corresponding binding point grayscale, so that the output compensation coefficient may be used as the Gain in the following formula: Gray_real=Gray_tar+Offset_interpxGain, such that the formula can be solved. In the application of the output compensation coefficient, the output compensation coefficient may be applied to multiple sub-pixels of multiple display areas simultaneously.

It should be noted that the first set of initial compensation coefficients G1 may be used as one set of the second sets of initial compensation coefficients, and further, may be used as the first second set of the second sets of initial compensation coefficients. Correspondingly, the first set of initial compensation coefficients G1 is equal to the first second set of compensation coefficients G21, that is, G1=G21= [Gain_R_0, Gain_G_0, Gain_B_0]=[Gain_0, Gain_0, Gain_0]. The first second set of initial compensation coefficients are used as the reference compensation coefficients, that is, the first set of initial compensation coefficients are used as the reference compensation coefficient.

In the operations shown in FIGS. 2A to 2C, if the initial luminance and chrominance data responds linearly to the first initial compensation sub-coefficient, the second initial compensation sub-coefficient, and the third initial compensation sub-coefficient in the second set of initial compensation coefficients, a sum of the deviation between the target compensation coefficient and the reference compensation coefficient corresponding to the target area and the reference compensation coefficients may be directly calculated to obtain the target compensation coefficient. However, when the deviations of the second set of initial compensation coefficients are quite large, or the deviation between the second target luminance and chrominance data and the reference luminance and chrominance data corresponding to the target area is quite large, the initial luminance and chrominance data responds non-linearly to the first initial compensation sub-coefficient, the second initial compensation sub-coefficient, and the third initial compensation sub-coefficient in the second set of initial compensation coefficients, which affects the accuracy of the calculated target compensation coefficient and output compensation coefficient.

Therefore, in the process of obtaining the output compensation coefficient, whether the target compensation coefficient and a result (such as an intermediate compensation coefficient as described below) obtained based on the target compensation coefficient satisfy the performance index requirement is verified. In response to determining that the target compensation coefficient or the result does not satisfy the performance index requirement, iterative calculations may be performed until the result obtained based on the target compensation coefficient satisfies the perform index requirement, and then the correspondingly obtained result may be determined as the output compensation coefficient. In this way, an optimal output compensation coefficient under a corresponding binding point grayscale may be obtained, thereby optimizing the display performance of the displayed image when the display panel applies the output compensation coefficient under the corresponding binding point grayscale.

Figure 2D:
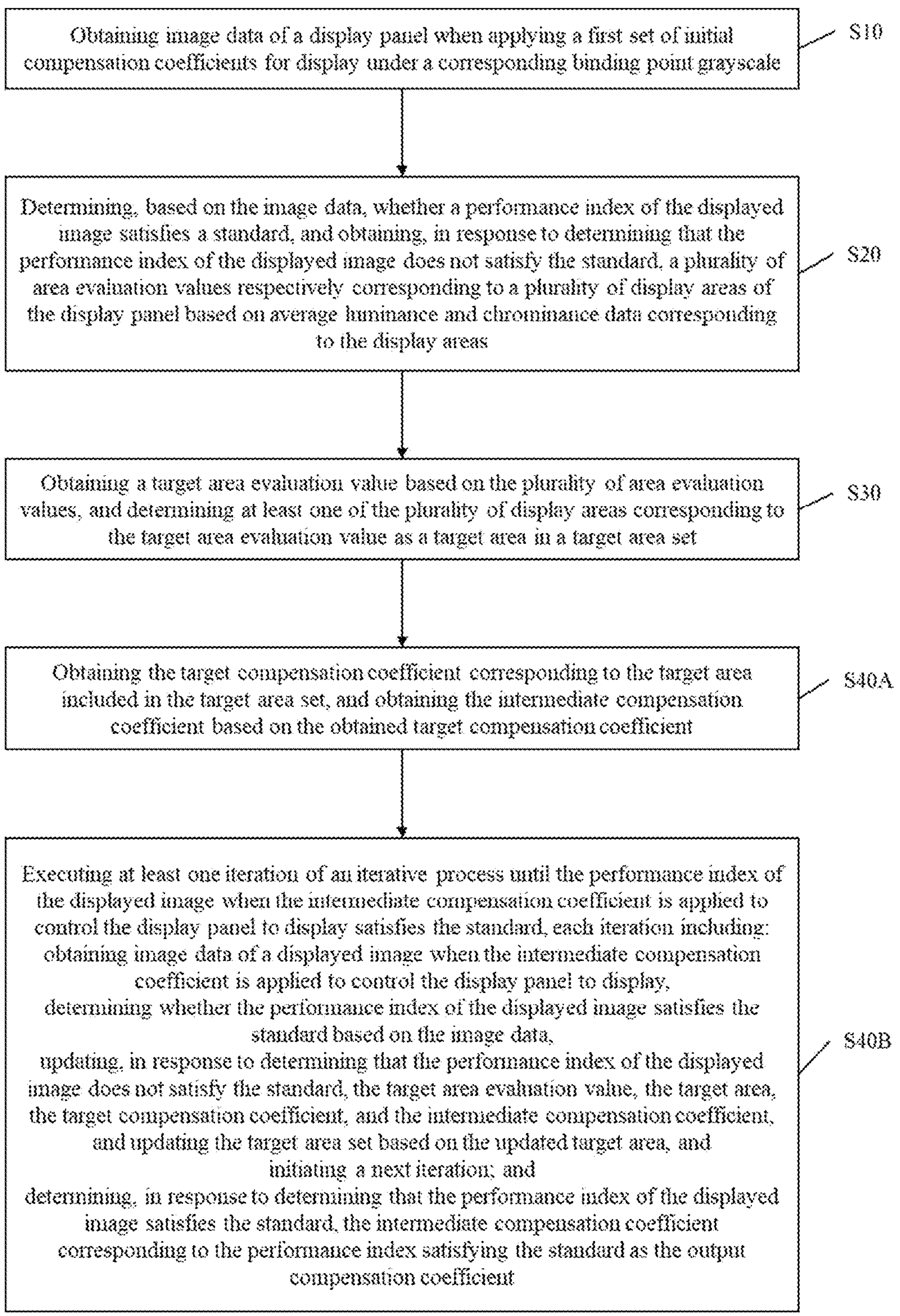

Accordingly, please continue to refer to FIG. 2D. In the operation S40, the obtaining of the target compensation coefficient corresponding to the target area in the target area set, and the obtaining of the output compensation coefficient based on the obtained target compensation coefficient so as to apply the output compensation coefficient for display of the display panel includes:

in S40A: obtaining the target compensation coefficient corresponding to the target area included in the target area set, and obtaining the intermediate compensation coefficient based on the obtained target compensation coefficient.

in S40B: executing (at least one time) an iterative process until the performance index of the displayed image when the display panel applies the intermediate compensation coefficient for display satisfies the standard, the iterative process including: obtaining the image data of a displayed image when the intermediate compensation coefficient is applied to control the display panel to display, determining whether the performance index of the displayed image satisfies the standard based on the image data, and in response to determining that the performance index of the displayed image does not satisfy the standard, updating the target area evaluation value, the target area, the target compensation coefficient, and the intermediate compensation coefficient, and returning back to the obtaining of the image data when the display panel applies the intermediate compensation coefficient for display; and determining the intermediate compensation coefficient corresponding to the performance index satisfying the standard as the output compensation coefficient.

That is, when the performance index of the displayed image corresponding to the first set of initial compensation coefficients fails to reach the standard, the area evaluation values corresponding to the display areas may be obtained based on the average luminance and chrominance data corresponding to the display areas, and then the target area evaluation value, the target area in the target area set, and the intermediate compensation coefficient may be obtained, so as to control the display panel to display with the intermediate compensation coefficient, and evaluate the performance index of the displayed image corresponding to the intermediate compensation coefficient. When the performance index of the displayed image corresponding to the application of the intermediate compensation coefficient does not meet the standard, the target area evaluation value, the target area(s) included in the target area set, and the intermediate compensation coefficient are updated, the display panel is controlled to display with the updated intermediate compensation coefficient, and whether the performance index of the displayed image corresponding to the application of the intermediate compensation coefficient to the display panel satisfies the standard is determined; and these operations are iteratively executed until the performance index of the displayed image reaches the standard, so that the intermediate compensation coefficient satisfying the performance index requirement of the display is obtained and then is used as the output compensation coefficient, realizing the adaptive adjustment of the compensation coefficient.

Figure 6A:
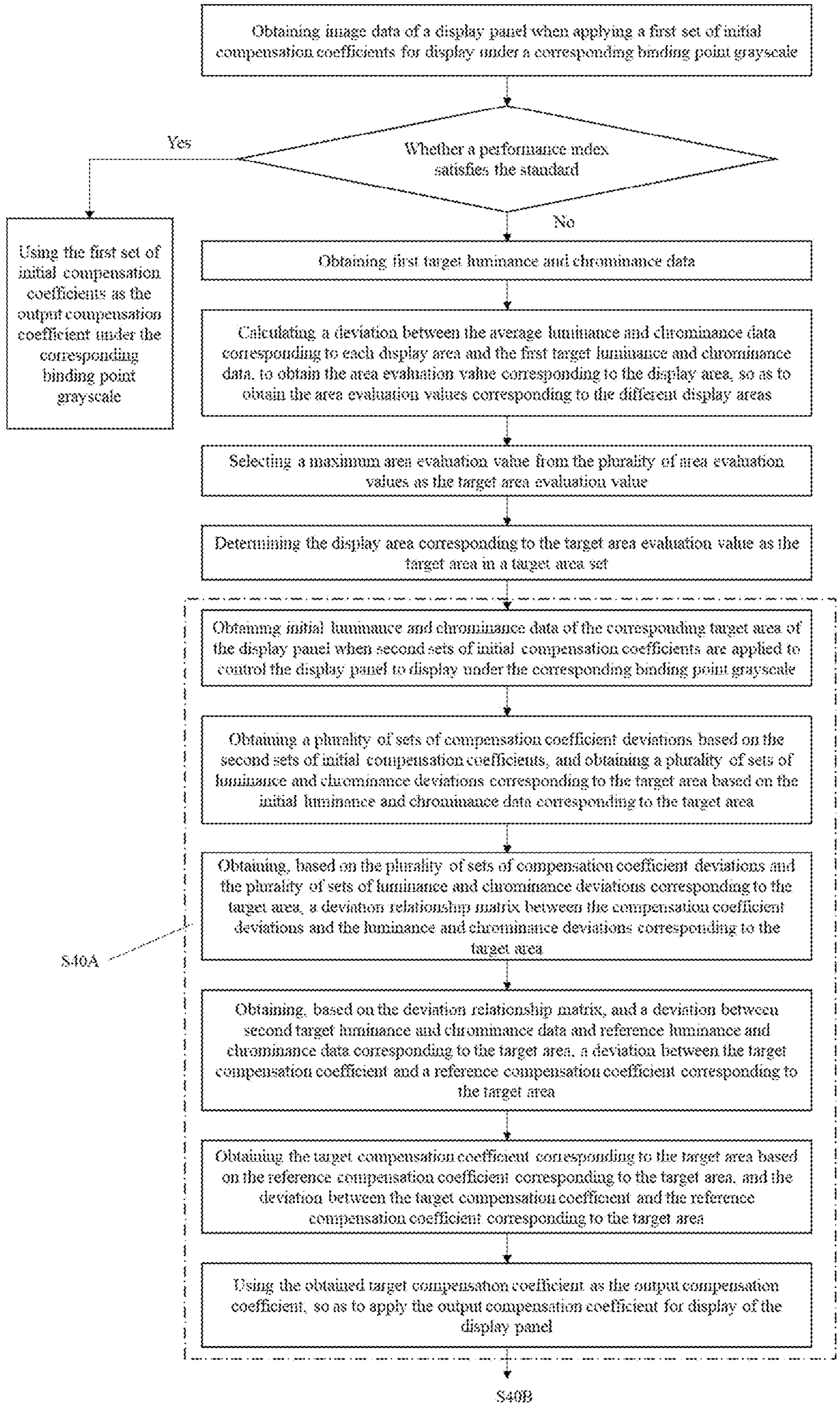
FIGS. 6A to 6B are flow charts for obtaining an intermediate compensation coefficient in FIG. 2D.
Figure 6B:
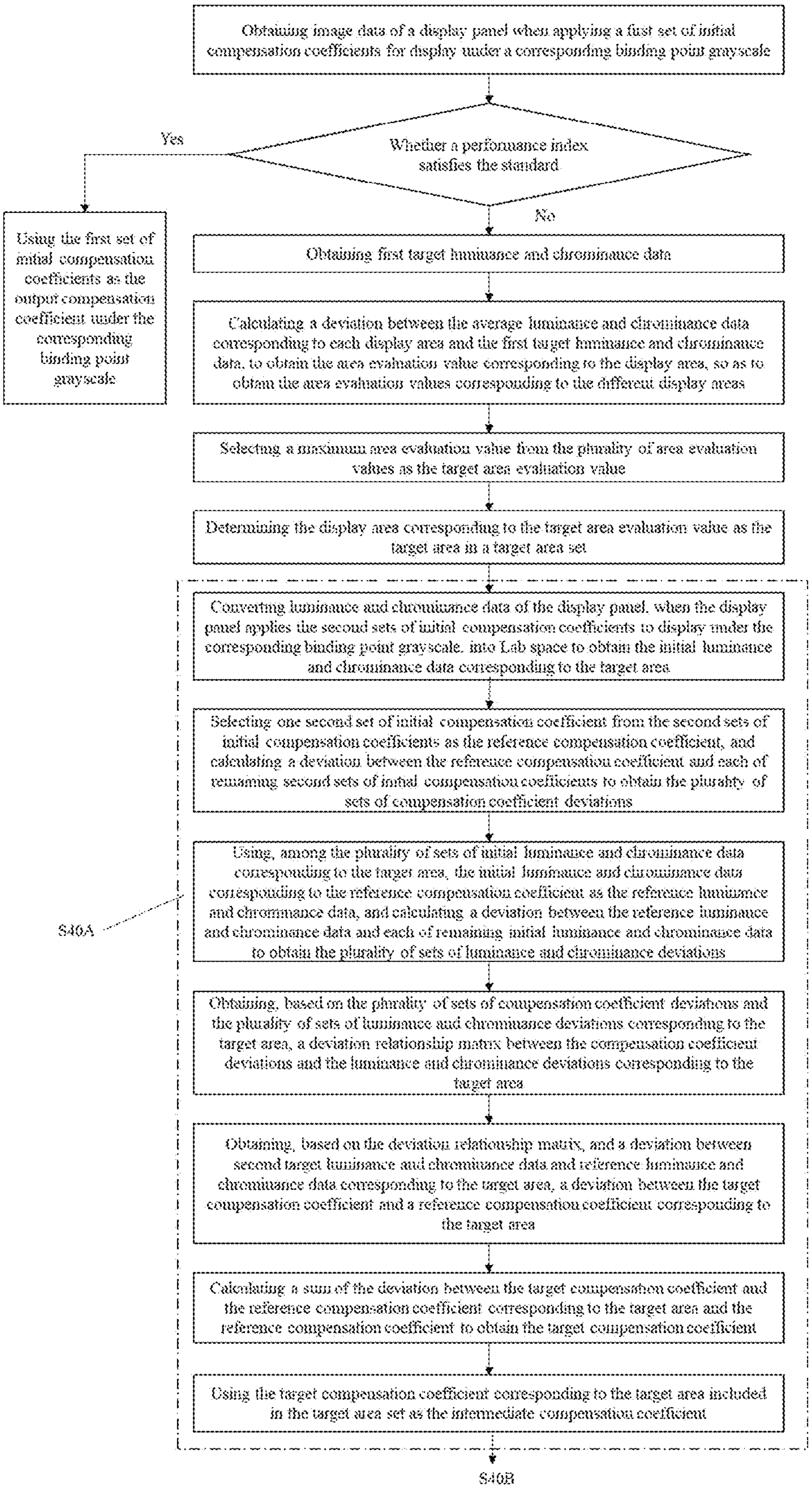

The target compensation coefficient in the operation S40A may be obtained by referring to the method of calculating the target compensation coefficient in FIGS. 2A to 2C, and the intermediate compensation coefficient in the operation S40A may be obtained by referring to the method of calculating the output compensation coefficient in FIGS. 2A to 2C. FIGS. 6A and 6B show the flow charts for obtaining the intermediate compensation coefficient in FIG. 2D.

In the operation S40B, each time the performance index of the displayed image does not meet the standard, at least one target area may be determined accordingly (that is, not excluding such circumstance where there are multiple equal area evaluation values in the plurality of area evaluation values, and the multiple equal area evaluation values are determined as the maximum value) to be added into the target area set.

Correspondingly, FIGS. 7A to 7D are flow charts for obtaining the output compensation coefficient in FIG. 2D. In the operation S40B, when the performance index of the displayed image does not meet the standard, the obtaining of the target area evaluation value and the target area may refer to the aforementioned operations S20 to S30. The first target luminance and chrominance data corresponding in the operation S40B is the average luminance and chrominance data corresponding to the central display area of the display panel when the display panel applies the intermediate compensation coefficient for display. The corresponding average luminance and chrominance data in the operation S40B are the corresponding average luminance and chrominance data of the display panel when the display panel applies the intermediate compensation coefficient for display.

In the operation S40B, the target areas included in the target area set are updated, and the newly added target area in the target area set is obtained after compensating the display performance of the display panel based on the previously obtained intermediate compensation coefficient. In addition, when the intermediate compensation coefficient obtained in the operation S40A is applied for display, the display performance of the corresponding target area in the target area set in the operation S40A has been improved, that is, the intermediate compensation coefficient has improved the display performance index. Therefore, in order to speed up the adaptive adjustment of the compensation coefficient, the intermediate compensation coefficient obtained in the operation S40A may be used as one set of the second sets of initial compensation coefficients to obtain the updated target compensation coefficient corresponding to the updated target area.

Figure 7A:
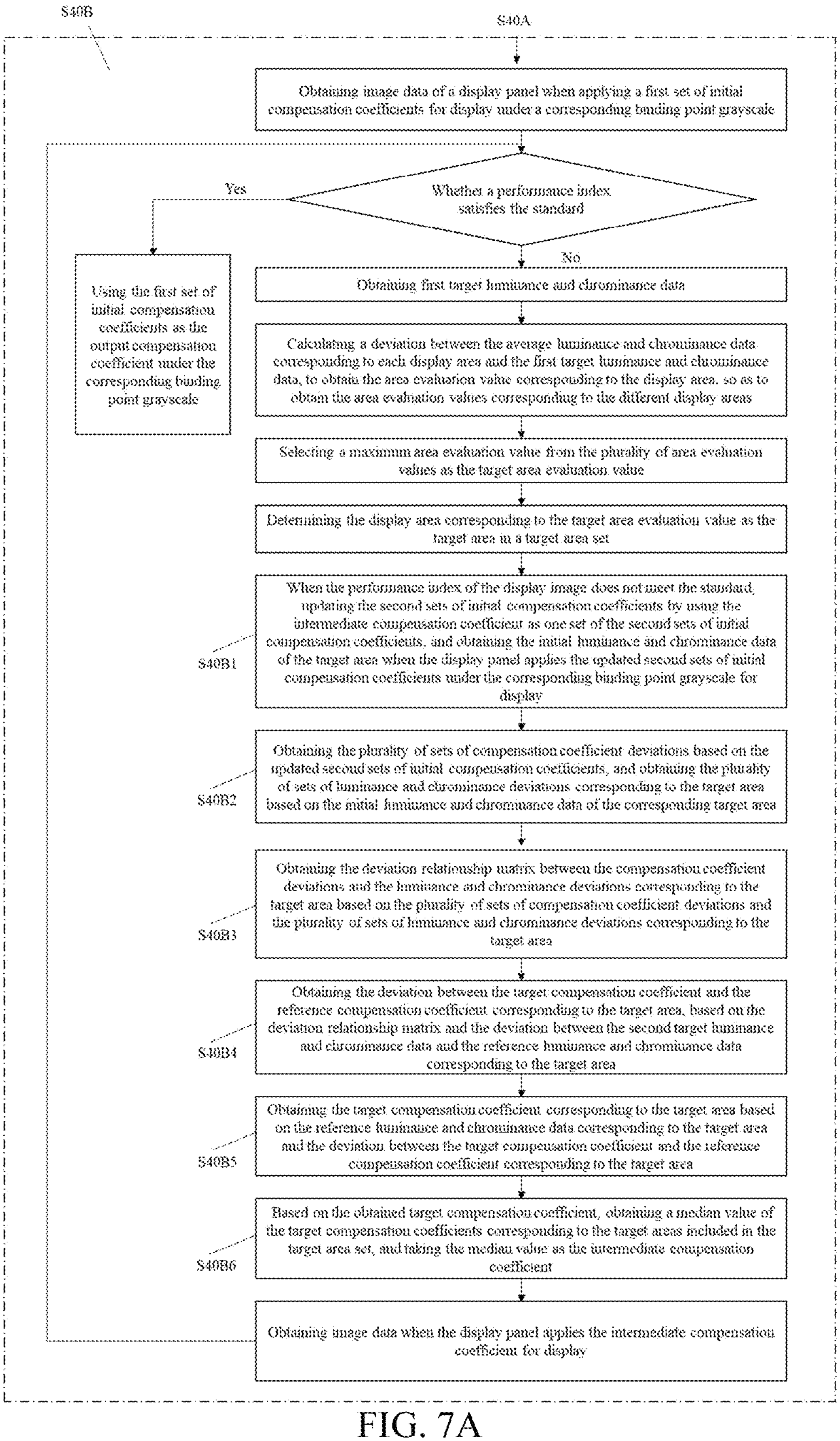
FIGS. 7A to 7D are flow charts for obtaining an output compensation coefficient in FIG. 2D.

Accordingly, please continue to refer to FIG. 7A. In the operation S40B, the updating of the target compensation coefficient in response to determining that the performance index of the displayed image does not satisfy the standard, includes:

in S40B1: when the performance index of the displayed image does not meet the standard, updating the second sets of initial compensation coefficients by using the intermediate compensation coefficient as one set of the second sets of initial compensation coefficients, and obtaining the initial luminance and chrominance data of the target area when the display panel applies the updated second sets of initial compensation coefficients to display under the corresponding binding point grayscale for display;

in S40B2: obtaining the plurality of sets of compensation coefficient deviations based on the updated second sets of initial compensation coefficients, and obtaining the plurality of sets of luminance and chrominance deviations corresponding to the target area based on the initial luminance and chrominance data of the corresponding target area;

in S40B3: obtaining the deviation relationship matrix between the compensation coefficient deviations and the luminance and chrominance deviations corresponding to the target area based on the plurality of sets of compensation coefficient deviations and the plurality of sets of luminance and chrominance deviations corresponding to the target area;

in S40B4: obtaining the deviation between the target compensation coefficient and the reference compensation coefficient corresponding to the target area, based on the deviation relationship matrix and the deviation between the second target luminance and chrominance data and the reference luminance and chrominance data corresponding to the target area;

in S40B5: obtaining the target compensation coefficient corresponding to the target area based on the reference luminance and chrominance data corresponding to the target area and the deviation between the target compensation coefficient and the reference compensation coefficient corresponding to the target area.

The initial luminance and chrominance data in the operation S40B1 may be obtained by referring to the operation S401. It should be noted that the corresponding luminance and chrominance data in the operation S40B1 may be directly obtained based on the obtained image data. That is, the luminance and chrominance data in the operation S40B1 may be directly read.

Since every application of the intermediate compensation coefficient to the display of the display panel has improved the display performance index to a certain degree, in order to further improve the improved display performance index, the intermediate compensation coefficient may be used as the reference compensation coefficient in the operation S40B2 to obtain the plurality of sets of compensation coefficient deviations.

Figure 7B:
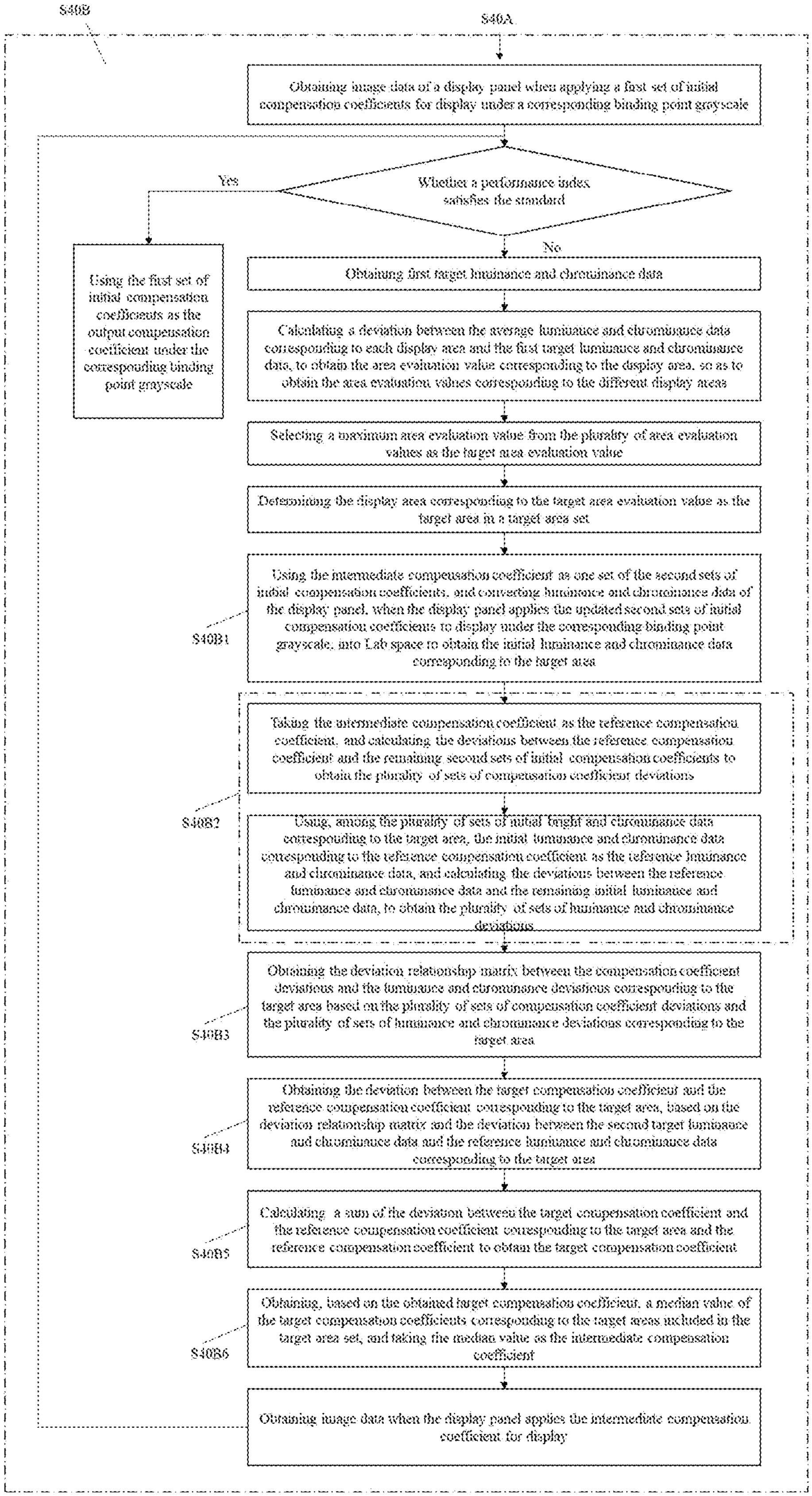

Correspondingly, please continue to refer to FIG. 7B. In the operation S40B2, the obtaining of the plurality of sets of compensation coefficient deviations based on the second sets of initial compensation coefficients, and the obtaining of the plurality of sets of luminance and chrominance deviations corresponding to the target area based on the initial luminance and chrominance data of the corresponding target area includes:

taking the intermediate compensation coefficient as the reference compensation coefficient, and calculating the deviations between the reference compensation coefficient and the remaining second sets of initial compensation coefficients to obtain the plurality of sets of compensation coefficient deviations; and among the plurality of sets of initial bright and chrominance data corresponding to the target area, using the initial luminance and chrominance data corresponding to the reference compensation coefficient as the reference luminance and chrominance data, and calculating the deviations between the reference luminance and chrominance data and the remaining initial luminance and chrominance data, to obtain the plurality of sets of luminance and chrominance deviations.

The deviation relationship matrix in the operation S40B3 may be obtained by referring to the operation S403. The deviation in the operation S40B4 between the target compensation coefficient and the reference compensation coefficient corresponding to the target area may be obtained by referring to the operation S404. The target compensation coefficient in the operation S40B5 may be obtained by referring to the aforementioned operation S405.

Since the area evaluation value may represent the deviation between the luminance and chrominance data corresponding to the target area and the first target luminance and chrominance data, if only the target compensation coefficient corresponding to the (original) target area (such as the first area AA1) with the largest deviation in the luminance and chrominance data is selected as the intermediate compensation coefficient, it will cause overcompensation in part of the display areas, resulting in a change of the area with the largest deviation of luminance and chrominance data. If the target compensation coefficient corresponding to a new area (such as the $z^{th}$ area AAz) with the largest deviation in the luminance and chrominance data is used as the intermediate compensation coefficient, it will cause undercompensation in the original target area (such as the first area AA1) with the largest deviation in the initial luminance and chroma data. Therefore, only selecting the target compensation coefficient corresponding to the target area with the largest deviation in the luminance and chrominance data as the intermediate compensation coefficient will cause the compensation to fall into repetition, which is not conducive to the convergence of the display compensation method.

If a median value of the target compensation coefficients respectively corresponding to all of the display areas is taken as the intermediate compensation coefficient, there will be an average luminance and chrominance data corresponding to a certain display area (for brevity, referred to as a reference display area hereinafter) close to the first target luminance and chrominance data. Correspondingly, the compensation value corresponding to the reference display area is small, and exhibits a small change when affected by the intermediate compensation coefficient, which may lead to too slow convergence or abnormal compensation values. For example, taking the condition where the average luminance and chrominance data of the reference display area is equal to the first target luminance and chrominance data when no compensation is performed as example, the corresponding compensation value of the reference display area is 0, then the target compensation coefficient corresponding to the reference display area does not affect an compensation effect (obtained according to the above-mentioned solution formula of the actual display grayscale Gray_real). Therefore, the target compensation coefficient corresponding to the reference display area may be any value. However, the target compensation coefficient corresponding to the reference display area will affect the median value of the target compensation coefficients corresponding to all the display areas, and will further affect the intermediate compensation coefficients corresponding to all the display areas, resulting in abnormal output compensation coefficients.

Therefore, in order to balance a convergence speed and mitigate the abnormal output compensation coefficients, each time when the performance index does not satisfy the standard, only the maximum value among the area evaluation values is selected as the target area evaluation value and the display area corresponding to the target area evaluation value is selected as a target area in the target area set. This allows for obtaining the intermediate compensation coefficient based on the target compensation coefficients corresponding to the target areas in the target area set. In this way, the target compensation coefficients corresponding to all areas in the target area set are taken into comprehensive consideration, and the intermediate compensation coefficient is obtained based on an intermediate coefficient (i.e., the target compensation coefficients corresponding the target areas which are obtained in different times to have the largest luminance and chrominance data deviation), for example, the intermediate compensation coefficient may be a median value of the target compensation coefficients corresponding to all areas in the target area set as described in S40B6. This avoids selecting the intermediate coefficient corresponding to a single target area with the largest luminance and chrominance data deviation as the intermediate compensation coefficient, and avoids including the display area with the average brightness and chrominance data close to the first target brightness and chrominance data into the target area set.

Accordingly, please continue to refer to FIGS. 7A to 7B. In the operation S40B, the updating of the intermediate compensation coefficient in response to determining that the performance index of the displayed image does not satisfy the standard include:

in S40B6: based on the obtained target compensation coefficients, obtaining a median value of the target compensation coefficients corresponding to the target areas included in the target area set, and taking the median value as the intermediate compensation coefficient.

In addition, the updated intermediate compensation coefficient in the operation S40B may be determined based on a statistical value such as a mean value. For example, based on the obtained target compensation coefficients, the mean value of the target compensation coefficients corresponding to the target areas included in the target area set may be obtained, and the mean value may be used as the intermediate compensation coefficient.

Hereinafter, on the basis of the aforementioned condition where p×q display areas AA include the first area AA1, the second area AA2, the third area AA3, . . . , and the $z^{th}$ area AAz, the p×q display areas AA include the central display area, and z>3, the display compensation methods of the display panel corresponding to FIG. 2D, FIGS. 6A to 6B, and FIGS. 7A to 7B will be explained.

With reference to FIGS. 6A to 6B, the aforementioned target compensation coefficient obtained by the display compensation method of the display panel shown in FIGS. 2A to 2C may be directly used as the target compensation coefficient in S40A, and the aforementioned output compensation coefficient obtained by the display compensation method for the display panel shown in FIGS. 2A-2C may be directly used as the intermediate compensation coefficient in S40A. For example, the output compensation coefficient obtained by the display compensation method for the display panel shown in FIG. 2A to FIG. 2C is Go=[Gain_4, Gain_4, Gain_4], and thus the intermediate compensation coefficient in S40A is Gm=[Gain_4, Gain_4, Gain_4].

In FIGS. 7A and 7B, when the display panel applies the intermediate compensation coefficient for display for the first time, if the performance index of the displayed image reaches the standard, the intermediate compensation coefficient will be used as the output compensation coefficient under the corresponding binding point grayscale.

When the performance index of the displayed image does not meet the standard, a first iteration (that is, those operations to be iteratively executed until the performance index of the displayed image reaches the standard in S40B) is started. At this time, the target area set only includes one target area (such as the above-mentioned first area AA1).

In obtaining of the first target luminance and chrominance data in the operation S40B, when the intermediate compensation coefficient is applied to the display panel for display, the average luminance and chrominance data corresponding to the center display area of the display panel is used as the first target luminance and chrominance data in the operation S40B. The corresponding first target luminance and chrominance data at this time includes first target luminance L_1_tar, first target red and green chrominance a_1_tar, and first yellow and blue chrominance b_0_tar. Hence, the corresponding first target luminance and chrominance data at this time is denoted as Meas_tar1=[L_1_tar, a_1_tar, b_1_tar].

Correspondingly, at this time, the average luminance and chrominance data corresponding to the first area AA1 includes average luminance L_1_0, average red-green chrominance a_1_0, and average yellow-blue chrominance b_1_0; and the luminance and chrominance data corresponding to the first area AA1 is denoted as Meas_0=[L_1_0, a_1_0, b_1_0]. The average luminance and chrominance data corresponding to the second area AA2 includes average luminance L_1_1, average red-green chrominance a_1_1, and average yellow-blue chrominance b_1_1; and the luminance and chrominance data corresponding to the second area AA2 is denoted as Meas_1=[L_1_1, a_1_1, b_1_1]. The luminance and chrominance data corresponding to the third area AA3 includes average luminance L_1_2, average red-green chrominance a_1_2, and average yellow-blue chrominance b_1_2; and the luminance and chrominance data corresponding to the third area AA3 is denoted as Meas_3=[L_1_2, a_1_2, b_1_2]. By analogy, the luminance and chrominance data corresponding to the $z^{th}$ area AAz includes average luminance L_1_(z−1), average red-green chrominance a_1_(z−1), and average yellow-blue chrominance b_1_(z−1); and the luminance and chrominance data corresponding to the z-th area AAz is denoted as Meas_(z−1)=[L_1_(z−1), a_1_(z−1), b_1_(z−1)].

Correspondingly, in obtaining the area average values corresponding to various display areas in the operation S40B, at this time, a deviation Meas_tar1-Meas_0 between the luminance and chrominance data Meas_0 corresponding to the first area AA1 and the first target luminance and chrominance data Meas_tar1 is an area evaluation value Cost_1_0 corresponding to the first area AA1. That is, Meas_tar1−Meas_0=Cost_1_0=[L_1_tar-L_1_0, a_1_tar-a_1_0, b_1_tar-b_1_0]. A deviation Meas_tar1−Meas_1 between the luminance and chrominance data Meas_1 corresponding to the second area AA2 and the first target luminance and chrominance data Meas_tar1 is an area evaluation value Cost_1_1 corresponding to the second area AA2. That is, Meas_tar1−Meas_1=Cost_1_1=[L_1_tar−L_1_1, a_1_tar−a_1_1, b_1_tar−b_1_1]. A deviation Meas_tar1-Meas_2 between the luminance and chrominance data Meas_2 corresponding to the third area AA3 and the first target luminance and chrominance data Meas_tar1 is an area evaluation value Cost_1_2 corresponding to the third area AA3. That is, Meas_tar1−Meas_2=Cost_1_2=[L_1_tar−L_1_2, a_1_tar−a_1_2, b_1_tar−b_1_2]. By analogy, a deviation Meas_tar1−Meas_(z−1) between the luminance and chrominance data Meas_(z−1) corresponding to the $z^{th}$ area AAz and the first target luminance and chrominance data Meas_tar1 is an area evaluation value Cost_1_(z−1) corresponding to the $z^{th}$ area AAz. That is, Meas_tar1−Meas_(z−1)=Cost_1_(z−1)=[L_1_tar−L_1_(z−1), a_1_tar−a_1_(z−1), b_1_tar−b_1_(z−1)].

Therefore, in determining the target area evaluation values and the target areas in S40B, an updated maximum area evaluation value may be obtained among the plurality of area evaluation values. If the area evaluation value Cost_1_(z−1) corresponding to the $z^{th}$ area AAz is the largest area evaluation value, the area evaluation value Cost_1_(z−1)

corresponding to the $z^{th}$ area AAz is the target area evaluation value Cost_1_tar. Correspondingly, the $z^{th}$ area AAz serves as the target area in the target area set L<P>. At this time, the target area set L<P> includes two target areas (i.e., the first area AA1 obtained previously and the $z^{th}$ area AAz obtained here).

In the operation S40B1, since the intermediate compensation coefficient serves as one set of the second sets of compensation coefficients, at this time, the second sets of compensation coefficients include the first second set of compensation coefficients G21, the second second set of compensation coefficients G22, the third second set of compensation coefficients G23, the fourth second set of compensation coefficients G24, and the intermediate compensation coefficient Gm. Correspondingly, the second sets of initial compensation coefficients Gain_all are expressed as follows:

$$\text{Gain\_all} = \begin{bmatrix} G21 \\ G22 \\ G23 \\ G24 \\ Gm \end{bmatrix} = \begin{bmatrix} \text{Gain\_0} & \text{Gain\_0} & \text{Gain\_0} \\ \text{Gain\_1} & \text{Gain\_0} & \text{Gain\_0} \\ \text{Gain\_0} & \text{Gain\_2} & \text{Gain\_0} \\ \text{Gain\_0} & \text{Gain\_0} & \text{Gain\_3} \\ \text{Gain\_4} & \text{Gain\_4} & \text{Gain\_4} \end{bmatrix}.$$

By converting the luminance and chrominance data of the display panel when applying the second sets of initial compensation coefficients for display into the Lab space, the initial luminance and chrominance data of the corresponding target area is obtained, including the first initial luminance and chrominance data lab1, the second initial luminance and chrominance data lab2, the third luminance and chrominance data lab3, the fourth initial luminance and chrominance data lab4, and the initial luminance and chrominance data labm corresponding to the application of the intermediate compensation coefficient Gm to the display panel. The initial luminance and chrominance data labm corresponding to the application of the intermediate compensation coefficient Gm to the display panel includes initial luminance L*_4, initial red and green chrominance a*_4, and initial yellow and blue chrominance b*_4; and the first initial luminance and chrominance data is denoted as labm=[L*_4, a*_4, b*_4]. Correspondingly, the plurality of sets of initial luminance and chrominance data Meas_all may be recorded as follows:

$$\text{Meas\_all} = \begin{bmatrix} \text{lab1} \\ \text{lab2} \\ \text{lab3} \\ \text{lab3} \\ \text{lab}m \end{bmatrix} = \begin{bmatrix} L*\_0 & a*\_0 & b*\_0 \\ L*\_1 & a*\_1 & b*\_1 \\ L*\_2 & a*\_2 & b*\_2 \\ L*\_3 & a*\_3 & b*\_3 \\ L*\_4 & a*\_4 & b*\_4 \end{bmatrix}.$$

In S40B2, the intermediate compensation coefficient Gm is used as the reference compensation coefficient Gain_end, so as to obtain the deviations between the reference compensation coefficient Gain_end and the remaining second sets of initial compensation coefficients (i.e., the first second set of initial compensation coefficients G21 to the fourth second set of initial compensation coefficients G24) as below:

$$\text{Gain\_all-Gain\_end} = \begin{bmatrix} \text{Gain\_0-Gain\_4} & \text{Gain\_0-Gain\_4} & \text{Gain\_0-Gain\_4} \\ \text{Gain\_1-Gain\_4} & \text{Gain\_0-Gain\_4} & \text{Gain\_0-Gain\_4} \\ \text{Gain\_0-Gain\_4} & \text{Gain\_2-Gain\_4} & \text{Gain\_0-Gain\_4} \\ \text{Gain\_0-Gain\_4} & \text{Gain\_0-Gain\_4} & \text{Gain\_3-Gain\_4} \end{bmatrix}.$$

Correspondingly, the initial luminance and chrominance (i.e., the initial luminance and chrominance data labm) corresponding to the reference compensation coefficient Gain_end is used as the reference luminance and chrominance data Meas_end, so as to obtain the deviations between the reference luminance and chrominance data Meas_end and the remaining initial luminance and chrominance data (i.e., the first initial luminance and chrominance data lab1 to the fourth initial luminance and chrominance data lab4) as below:

$$\text{Meas\_all-Meas\_end} = \begin{bmatrix} L*\_0\text{-}L*\_4 & a*\_0\text{-}a*\_4 & b*\_0\text{-}b*\_4 \\ L*\_1\text{-}L*\_4 & a*\_1\text{-}a*\_4 & b*\_0\text{-}b*\_4 \\ L*\_2\text{-}L*\_4 & a*\_2\text{-}a*\_4 & b*\_0\text{-}b*\_4 \\ L*\_3\text{-}L*\_4 & a*\_3\text{-}a*\_4 & b*\_3\text{-}b*\_4 \end{bmatrix}.$$

Therefore, in S40B3, the following formula may be obtained according to the formula (Gain_all−Gain_end)×M=Meas_all−Meas_end to obtain the deviation relationship matrix M:

$$\begin{bmatrix} \text{Gain\_0-Gain\_4} & \text{Gain\_0-Gain\_4} & \text{Gain\_0-Gain\_4} \\ \text{Gain\_1-Gain\_4} & \text{Gain\_0-Gain\_4} & \text{Gain\_0-Gain\_4} \\ \text{Gain\_0-Gain\_4} & \text{Gain\_2-Gain\_4} & \text{Gain\_0-Gain\_4} \\ \text{Gain\_0-Gain\_4} & \text{Gain\_0-Gain\_4} & \text{Gain\_3-Gain\_4} \end{bmatrix} \times M = \begin{bmatrix} L*\_0\text{-}L*\_4 & a*\_0\text{-}a*\_4 & b*\_0\text{-}b*\_4 \\ L*\_1\text{-}L*\_4 & a*\_1\text{-}a*\_4 & b*\_1\text{-}b*\_4 \\ L*\_2\text{-}L*\_4 & a*\_2\text{-}a*\_4 & b*\_2\text{-}b*\_4 \\ L*\_3\text{-}L*\_4 & a*\_3\text{-}a*\_4 & b*\_3\text{-}b*\_4 \end{bmatrix}.$$

The luminance and chrominance data when the display panel applies the reference compensation coefficient Gain_end (i.e., the intermediate compensation coefficient Gm) for display is converted into the Lab space, to obtain the initial luminance and chrominance data lab_tar22 corresponding to the center display area as the second target luminance and chrominance data. The initial luminance and chrominance data lab_tar22 corresponding to the center display area includes initial luminance L*_1_tar2, initial red-green chrominance a*_1_tar2, and initial yellow-blue chrominance b*_1_tar2, and is denoted as lab_tar22=[L*_1_tar2, a*_1_tar2, b*_1_tar2]. Correspondingly, in S40B4, after obtaining the deviation relationship matrix M, the following formula may be obtained according to the formula (Gain_tar−Gain_end)×M=Meas_tar−Meas_end:

$$(\text{Gain\_tar-Gain\_end}) \times M = \text{Meas\_tar-Meas\_end} = [\,L*\_1\_\text{tar2-}L*\_4 \quad a*\_1\_\text{tar2-}a*\_4 \quad b*\_1\_\text{tar2-}b*\_4\,].$$

Therefore, the deviation between the target compensation coefficient Gain_tar and the reference compensation coefficient Gain_end corresponding to the target area, i.e., Gain_tar−Gain_end, may be obtained.

In the operation S40B5, by calculating a sum of the reference compensation coefficient Gain_end corresponding to the target area and the deviation between the reference compensation coefficient Gain_end and the target compensation coefficient Gain_tar, the target compensation coefficient Gain_tar corresponding to the target area may be obtained, that is, Gain_tar−Gain_end+ (Gain_tar−Gain_end).

Since the image data is collected across the entire display panel, and the initial luminance and chrominance data respectively corresponding to different target areas AA_tar varies, the target compensation coefficients respectively corresponding to different target areas AA_tar may vary. In order to obtain a better compensation effect in the plurality of display areas, in S40B6, the median value of the target compensation coefficients corresponding to the target areas (i.e., the first area AA1 and the $z^{th}$ area AAz) included in the target area set is used as the intermediate compensation coefficient Gm, to obtain the image data again when the display panel applies the intermediate compensation coefficient for display.

When the intermediate compensation coefficient (that is, the intermediate compensation coefficient obtained based on the median value of the target compensation coefficients corresponding to the first area AA1 and the $z^{th}$ area AAz) is applied to the display panel for display, if the performance index of the displayed image still does not meet the standard, the number of the target areas in the target area set will be updated again, for example, the number of target areas in the target area set will be increased from two to three. At this point, a second iteration is started. The intermediate compensation coefficient (that is, the intermediate compensation coefficient obtained based on the median value of the target compensation coefficients corresponding to the first area AA1 and the $z^{th}$ area AAz) is used as one set of the second set of initial compensation coefficients and used as the reference compensation coefficient. The number of the second sets of initial compensation coefficients is increased by one (the added one is the intermediate compensation coefficient obtained based on the median value of the target compensation coefficients corresponding to the first area AA1 and the $z^{th}$ area AAz) on the basis of the previous number of five (including G21, G22, G23, G24, and Gm), to update the target compensation coefficient and the intermediate compensation coefficient of the target area again until the performance index of the displayed image when display panel applies the intermediate compensation coefficient satisfies the standard. In such case, the intermediate compensation coefficient corresponding the performance index satisfying the standard is used as the output compensation coefficient, so as to applying the output compensation coefficient to calculate the actual display grayscale Gray_real. During the application of the output compensation coefficient, the output compensation coefficient may be applied to multiple sub-pixels of multiple display areas simultaneously.

In addition, in the display compensation method for the display panel shown in FIG. 2D, when the intermediate compensation coefficient in S40A is applied for display, the display performance of the corresponding target area in the target area set in the operation S40A has been improved. That is, the application of the intermediate compensation coefficient in S40A for display actually reflects the impact of the original second sets of initial compensation coefficients on the display performance. Therefore, when the intermediate compensation coefficient is applied for display and the performance index of the displayed image still does not meet the standard, the second sets of initial compensation coefficients may be reset in obtaining the updated target compensation coefficient of S40B to speed up the iteration.

Figure 7C:
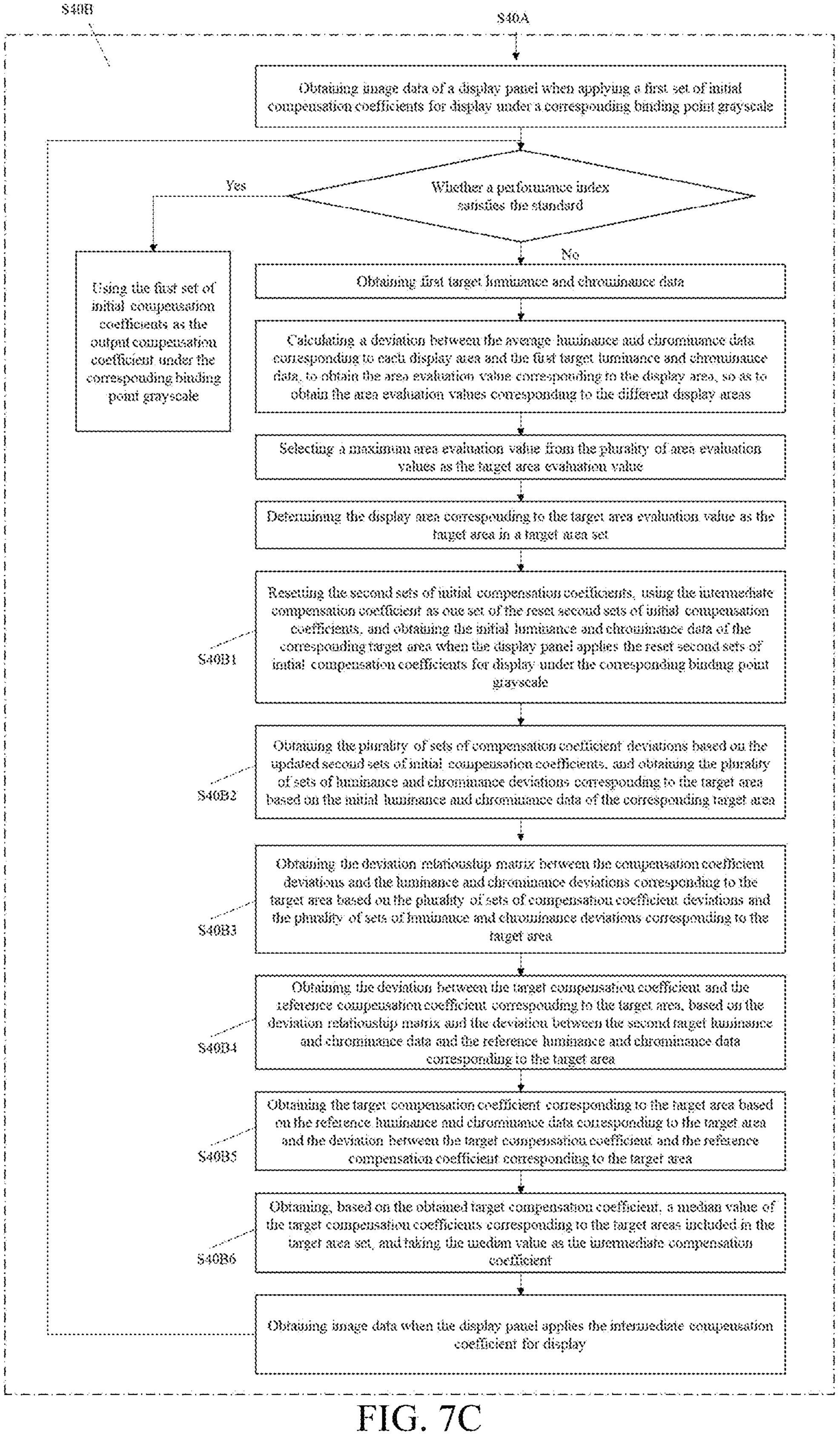
Figure 7D:
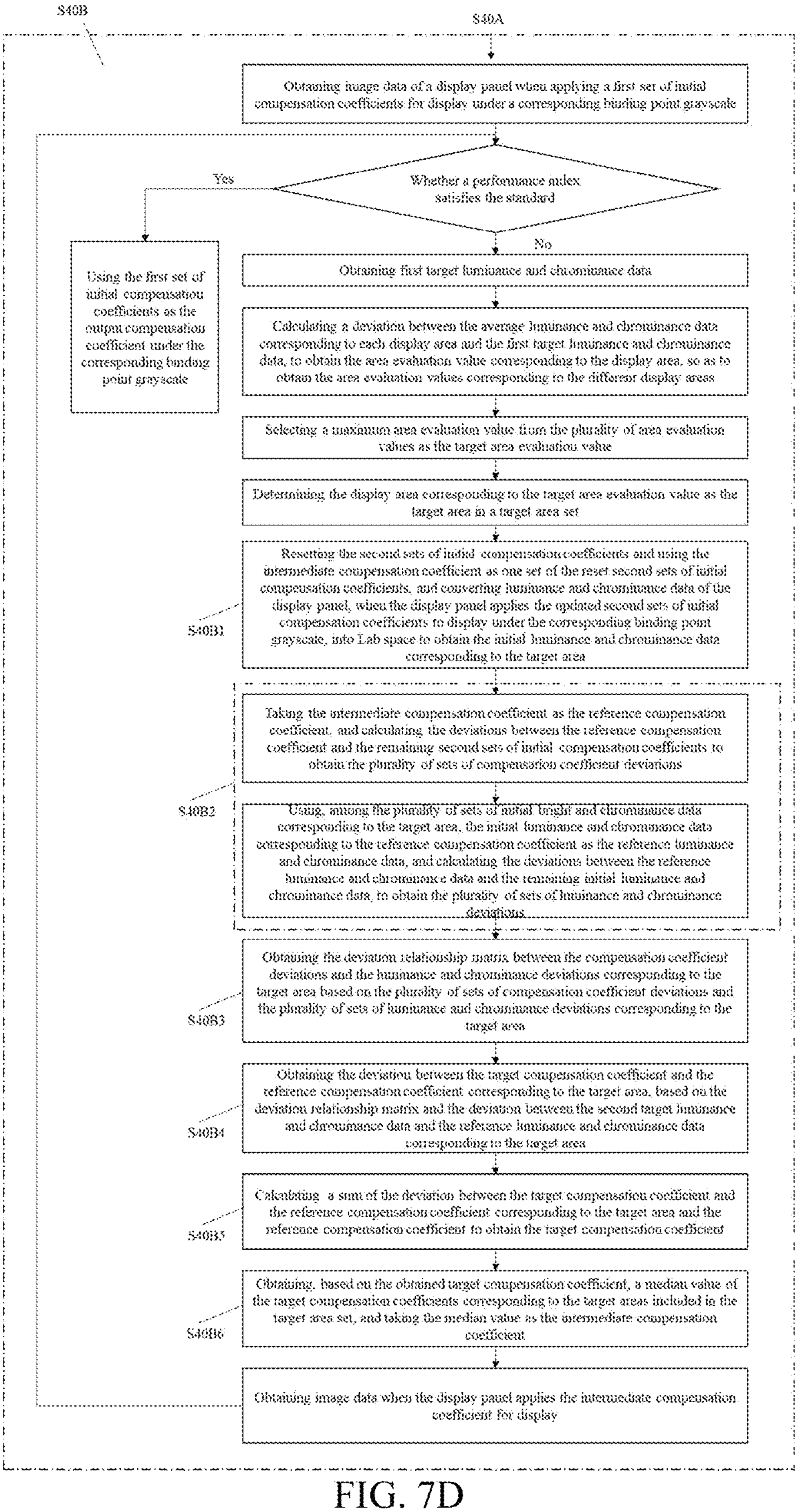

Correspondingly, in the display compensation method for the display panel shown in FIG. 2D and the operations of obtaining the intermediate compensation coefficient shown in FIGS. 6A to 6B, a design corresponding to FIGS. 7C to 7D may further be obtained.

Please continue to refer to FIG. 2D, FIGS. 6A to 6B, and FIG. 7C. In the operation S40B, the updating of the target compensation coefficient in response to determining that the performance index of the displayed image does not satisfy the standard includes:

in S40B1: when the performance index of the displayed image does not meet the standard, resetting the second sets of initial compensation coefficients, using the intermediate compensation coefficient as one set of the reset second sets of initial compensation coefficients, and obtaining the initial luminance and chrominance data of the corresponding target area when the display panel applies the reset second sets of initial compensation coefficients for display under the corresponding binding point grayscale;

in S40B2: obtaining the plurality of sets of compensation coefficient deviations based on the reset second sets of initial compensation coefficients, and obtaining the plurality of sets of luminance and chrominance deviations corresponding to the target area based on the initial luminance and chrominance data of the corresponding target area;

in S40B3: obtaining the deviation relationship matrix between the compensation coefficient deviations and the luminance and chrominance deviations corresponding to the target area based on the plurality of sets of compensation coefficient deviations and the plurality of sets of luminance and chrominance deviations corresponding to the target area;

in S40B4: obtaining the deviation between the target compensation coefficient and the reference compensation coefficient corresponding to the target area, based on the deviation relationship matrix and the deviation between the second target luminance and chrominance data and the reference luminance and chrominance data corresponding to the target area; and in S40B5: obtaining the target compensation coefficient corresponding to the target area based on the reference compensation coefficient corresponding to the target area and the deviation between the target compensation coefficient and the reference compensation coefficient corresponding to the target area.

The initial luminance and chrominance data in the operation S40B1 may be obtained by referring to the aforementioned operation S40B1. It should be noted that the luminance and chrominance data corresponding to the intermediate compensation coefficient in the operation S40B1 may be obtained directly based on the obtained image data when the intermediate compensation coefficient is applied for display. That is, the luminance and chrominance data corresponding to the intermediate compensation coefficient in the operation S40B1 may be directly read. For the reset second sets of initial compensation coefficients, the corresponding image data, luminance and chrominance data, etc., may be obtained through the image acquisition module.

The first initial compensation sub-coefficient, the second initial compensation sub-coefficient, and the third initial compensation sub-coefficient of the reset second sets of initial compensation coefficients and the intermediate compensation coefficients in the operation S40B1 may be changed in a unit step size.

The plurality of sets of compensation coefficient deviations and the plurality of sets of luminance and chrominance deviations in the operation S40B2 may be obtained by referring to the operation S40B2 in FIG. 7A. The deviation relationship matrix in the operation S40B3 may be obtained by referring to the operation S40B3 in FIG. 7A. The deviation between the target compensation coefficient and the reference compensation coefficient corresponding to the target area may be obtained by referring to the operation S40B4 in FIG. 7A. The target compensation coefficient in the operation S40B5 may be obtained by referring to the aforementioned operation S40B5 in FIG. 7A.

Similar to FIGS. 7A to 7B, in FIGS. 7C to 7D, in the operation S40B in FIG. 2D, the updating of the intermediate compensation coefficient in response to determining that the performance index of the displayed image does not satisfy the standard includes:

in S40B6: based on the obtained target compensation coefficients, obtaining the median value of the target compensation coefficients corresponding to the target areas included in the target area set, and using the median value as the intermediate compensation coefficient.

Hereinafter, the display compensation methods corresponding to FIG. 2D, FIG. 6A to FIG. 6B, and FIG. 7C to FIG. 7D will be described by taking the following condition as an example, where: the p×q display areas include a first area AA1, a second area AA2, a third area AA3, . . . , a $z^{th}$ area AAz, the p×q display areas include a central display area, and z>3.

In FIGS. 6A to 6B, the target compensation coefficient obtained by the display compensation method for the display panel shown in FIGS. 2A to 2C may be directly used as the target compensation coefficient in the operation S40A. The output compensation coefficient obtained according to the display compensation method for display panel in FIGS. 2A to 2C may be directly used as the intermediate compensation coefficient in the operation S40A. For example, the output compensation coefficient obtained by the display compensation method for the display panel shown in FIG. 2A to FIG. 2C is Go=[Gain_4, Gain_4, Gain_4], and the intermediate compensation coefficient Gm=[Gain_4, Gain_4, Gain_4] in operation S40A may be obtained accordingly.

In FIGS. 7C to 7D, when the display panel applies the intermediate compensation coefficient for display for the first time, if the performance index of the displayed image reaches the standard, the intermediate compensation coefficient will be used as the output compensation coefficient under the corresponding binding point grayscale.

When the performance index of the displayed image does not meet the standard, the corresponding operation S40B is performed to obtain the first target luminance and chrominance data and determine the area evaluation value, the target area evaluation value, and the target area, so that the target area set L<P> changes from including one target area to including two target areas. Reference may be made to the relevant description of the target area set L<P> including two target areas (which are the first area AA1 and the $z^{th}$ area AAz) as described above.

In operation S40B1, the reset second sets of initial compensation coefficients include a fifth second set of compensation coefficients G25=[Gain_5, Gain_4, Gain_4], a sixth second set of compensation coefficients G26=[Gain_4, Gain_6, Gain_4], and a seventh second set of compensation coefficients G27=[Gain_4, Gain_4, Gain_7]. Furthermore, the intermediate compensation coefficient serves as one set of the second sets of compensation coefficients. Therefore, at this time, the second sets of initial compensation coefficients Gain_all are expressed as follows:

$$\text{Gain\_all} = \begin{bmatrix} Gm \\ G25 \\ G26 \\ G27 \end{bmatrix} = \begin{bmatrix} \text{Gain\_4} & \text{Gain\_4} & \text{Gain\_4} \\ \text{Gain\_5} & \text{Gain\_4} & \text{Gain\_4} \\ \text{Gain\_4} & \text{Gain\_6} & \text{Gain\_4} \\ \text{Gain\_4} & \text{Gain\_4} & \text{Gain\_7} \end{bmatrix}.$$

The luminance and chrominance data of the display panel when applying the second sets of initial compensation coefficients for display is converted into the Lab space, the initial luminance and chrominance data of the corresponding target area is obtained, including fifth initial luminance and chrominance data lab5=[L*_5, a*_5, b*_5], sixth initial luminance and chrominance data lab6=[L*_6, a*_6, b*_6], seventh luminance and chrominance data lab7=[L*_7, a*_7, b*_7], and the initial luminance and chrominance data labm=[L*_4, a*_4, b*_4] corresponding to the application of the intermediate compensation coefficient Gm for display. Correspondingly, the plurality sets of initial luminance and chrominance data Meas_all may be denoted as follows:

$$\text{Meas\_all} = \begin{bmatrix} \text{lab}m \\ \text{lab5} \\ \text{lab6} \\ \text{lab7} \end{bmatrix} = \begin{bmatrix} L*\_4 & a*\_4 & b*\_4 \\ L*\_5 & a*\_5 & b*\_5 \\ L*\_6 & a*\_6 & b*\_6 \\ L*\_7 & a*\_7 & b*\_7 \end{bmatrix}.$$

In the operation S40B2, the intermediate compensation coefficient Gm is used as the reference compensation coefficient Gain_end, to obtain the deviations between the reference compensation coefficient Gain_end and the remaining second sets of initial compensation coefficients (i.e., the fifth second set of initial compensation coefficients G25 to the seventh set of initial compensation coefficients G27) as below:

$$\text{Gain\_all-Gain\_end} = \begin{bmatrix} \text{Gain\_5-Gain\_4} & \text{Gain\_4-Gain\_4} & \text{Gain\_4-Gain\_4} \\ \text{Gain\_4-Gain\_4} & \text{Gain\_6-Gain\_4} & \text{Gain\_4-Gain\_4} \\ \text{Gain\_4-Gain\_4} & \text{Gain\_4-Gain\_4} & \text{Gain\_7-Gain\_4} \end{bmatrix}.$$

Correspondingly, the initial luminance and chrominance data (i.e., the initial luminance and chrominance data labm) corresponding to the reference compensation coefficient Gain_end is used as the reference luminance and chrominance data Meas_end, and the deviations between the reference luminance and chrominance data Meas_end and the remaining initial luminance and chrominance data (i.e., the fifth initial luminance and chrominance data to the seventh initial luminance and chrominance data lab7) are obtained as follows:

$$\text{Meas\_all-Meas\_end} = \begin{bmatrix} L*\_5\text{-}L*\_4 & a*\_5\text{-}a*\_4 & b*\_5\text{-}b*\_4 \\ L*\_6\text{-}L*\_4 & a*\_6\text{-}a*\_5 & b*\_6\text{-}b*\_5 \\ L*\_7\text{-}L*\_4 & a*\_7\text{-}a*\_4 & b*\_7\text{-}b*\_6 \end{bmatrix}.$$

Therefore, in the operation S40B3, according to the formula (Gain_all−Gain_end)×M=Meas_all−Meas_end, the following formula may be obtained to obtain the deviation relationship matrix M.

$$\begin{bmatrix} Gain\_5\text{-}Gain\_4 & Gain\_4\text{-}Gain\_4 & Gain\_4\text{-}Gain\_4 \\ Gain\_4\text{-}Gain\_4 & Gain\_6\text{-}Gain\_4 & Gain\_4\text{-}Gain\_4 \\ Gain\_4\text{-}Gain\_4 & Gain\_4\text{-}Gain\_4 & Gain\_7\text{-}Gain\_4 \end{bmatrix} \times$$

$$M = \begin{bmatrix} L*\_5\text{-}L*\_4 & a*\_5\text{-}a*\_4 & b*\_5\text{-}b*\_4 \\ L*\_6\text{-}L*\_4 & a*\_6\text{-}a*\_4 & b*\_6\text{-}b*\_4 \\ L*\_7\text{-}L*\_4 & a*\_7\text{-}a*\_4 & b*\_7\text{-}b*\_4 \end{bmatrix}.$$

The luminance and chrominance data of the display panel when applying the reference compensation coefficient Gain_end (i.e., the intermediate compensation coefficient Gm) for display is converted into the Lab space, so as to obtain the initial luminance and chrominance data lab_tar22=[L*_1_tar2, a*_1_tar2, b*_1_tar2] corresponding to the central display area as the second target luminance and chrominance data. Correspondingly, in the operation S40B4, after obtaining the deviation relationship matrix M, the following formula may be obtained according to the formula (Gain_tar–Gain_end)×M=Meas_tar–Meas_end.

$$(Gain\_tar\text{-}Gain\_end) \times M = Meas\_tar\text{-}$$
$$Meas\_end = [\,L*\_1\_tar2\text{-}L*4 \quad a*\_1\_tar2\text{-}a*4 \quad b*\_1\_tar2\text{-}b*4\,].$$

Therefore, the deviation between the target compensation coefficient Gain_tar and the reference compensation coefficient Gain_end corresponding to the target area, i.e., Gain_tar-Gain_end, may be obtained.

In the operation S40B5, by calculating a sum of the reference compensation coefficient Gain_end corresponding to the target area and the deviation between the reference compensation coefficient Gain_end and the target compensation coefficient Gain_tar, the target compensation coefficient Gain_tar corresponding to the target area may be obtained. That is, Gain_tar–Gain_end+ (Gain_tar–Gain_end).

Since image data is collected across the entire panel, and the initial luminance and chrominance data corresponding to different target areas AA_tar will be different, the target compensation coefficients corresponding to different target areas AA_tar may be different. In order to obtain a better compensation effect in the plurality of display areas, in the operation S40B6, the median value of the target compensation coefficients corresponding to the target areas included in the target area set (i.e., the first area AA1 and the $z^{th}$ area AAz) is used as the intermediate compensation coefficient, so as to obtain corresponding image data when the display panel applies the intermediate compensation coefficient for display.

When the intermediate compensation coefficient (that is, the intermediate compensation coefficient obtained based on the median value of the target compensation coefficients corresponding to the first area AA1 and the $z^{th}$ area AAz) is applied again for display, and the performance index of the displayed image still does not meet the standard, the number of the target areas in the target area set will be updated again, for example, the number of target areas in the target area set will be increased from two to three. At this point, the second iteration is started. Moreover, the intermediate compensation coefficient (that is, the intermediate compensation coefficient obtained based on the median value of the target compensation coefficients corresponding to the first area AA1 and the $z^{th}$ area AAz) is again used as one set of the second sets of initial compensation coefficients and as the reference compensation coefficient, to update the target compensation coefficient and the intermediate compensation coefficient of the target area again until the performance index of the displayed image when the display panel applies the intermediate compensation coefficient satisfies the standard. In such case, the intermediate compensation coefficient corresponding the performance index satisfying the standard is used as the output compensation coefficient, so as to applying the output compensation coefficient to calculate the actual display grayscale Gray_real. During the application of the output compensation coefficient, the output compensation coefficient may be applied to multiple sub-pixels of multiple display areas simultaneously.

Please continue to refer to FIG. 2D. Before the intermediate compensation coefficient is used as one set of the second sets of initial compensation coefficients, the intermediate compensation coefficient is obtained based on the second sets of initial compensation coefficients, the performance index of the displayed image corresponding to the application of the intermediate compensation coefficient is better than the performance index of the displayed image corresponding to the application of the second sets of initial compensation coefficients. Therefore, in order to further improve the performance index of the displayed image, a weight of the intermediate compensation coefficient may be increased during a process of verifying whether the intermediate compensation coefficient is the output compensation coefficient (that is, during the process for executing operation S40B). That is, in solving a system of overdetermined equations, a weighted least squares solution is calculated to obtain the deviation relationship matrix.

Correspondingly, in FIGS. 7A to 7D, in the obtaining the deviation relationship matrix between the compensation coefficient deviations and the luminance and chrominance deviations corresponding to the target area based on the plurality of sets of compensation coefficient deviations and the plurality of sets of luminance and chrominance deviations corresponding to the target area of the operation S40B, a weight of the intermediate compensation coefficient is greater than weights of the remaining second sets of the initial compensation coefficients.

It should be noted that the first set of initial compensation coefficients in the display compensation method for the display panel shown in FIGS. 2A to 2C may be the output compensation coefficient obtained in the display compensation method for the display panel shown in FIG. 2D and FIGS. 7A to 7D. That is, the output compensation coefficient obtained by the display compensation method for the display panel shown in FIG. 2D and FIG. 7A~FIG. 7D may be further fine-tuned by using the display compensation method for the display panel shown in FIGS. 2A~FIG. 2C. Among multiple display panels produced in a same batch, after an output compensation coefficient of one display panel is obtained by applying the display compensation method for the display panel shown in FIG. 2D and FIGS. 7A to 7D, the output compensation coefficient of the display panel may be used as the first set of initial compensation coefficient of the other display panel and applied to the display compensation of the display panel shown in FIGS. 2A to 2C, so that only one display panel in the same batch of the display panels undergoes multiple iteration processes. Since process design parameters of the display panels produced in the same batch are same, the other display panels only need to perform the display compensation method for the display panel shown in FIG. 2A to FIG. 2C based on the output compensation coefficient obtained by the one display panel, to enable the output compensation coefficient applied to other display panels meet the performance index, thereby compensating for deviations in display performance of the display panels in the same batch caused by factors such as process accuracy. Therefore, the adjustment time of the output compensation coefficient corresponding to the display panels of the same batch may be shortened.

It should be noted that in the above display compensation method for each display panel, the intermediate compensation coefficient may be applied to all display areas.

In the above display compensation method for each display panel, the target compensation coefficients corresponding to the plurality of target areas may be obtained simultaneously.

In some other embodiments, the target compensation coefficient corresponding to each target area may be obtained independently. That is, in the above operation S40B, the updating of the target compensation coefficient in response to determining that the performance index of the displayed image does not satisfy the standard may further include verification of the target compensation coefficient corresponding to each target area.

The verification of the target compensation coefficient includes: determining the performance index when the display panel applies the target compensation coefficient for display; when the performance index of the display reaches the standard, determining the target compensation coefficient as the target compensation coefficient required for the target area. When the performance index of the displayed image does not meet the standard, the target compensation coefficient is used as one set of the second sets of initial compensation coefficients to obtain the updated deviation relationship matrix and the updated target compensation coefficient until the performance index of the displayed image reaches the standard. The target compensation coefficient making the performance index satisfy the standard is determined as the target compensation coefficient required for the target area. Compared with the method in which the target compensation coefficients corresponding to the plurality of target areas may be obtained simultaneously, the implementation method in which the target compensation coefficient corresponding to each target area is obtained independently will increase the number of iterations.

Optionally, after obtaining the output compensation coefficient, a storage module may be used to store the output compensation coefficients corresponding to different binding point grayscales.

Optionally, a display driving module may be used to control the display panel to apply one of the first set of initial compensation coefficients, the second sets of initial compensation coefficients, the target compensation coefficient, the intermediate compensation coefficient, etc., for display.

The display compensation methods for the display panel provided by the present disclosure convert a difficult-to-achieve relationship between the entire display effect of the display panel and the compensation coefficient into an easy-to-achieve relationship between the local area compensation effect and the compensation coefficient, so that the amount of data required for model establishment is decreased and the number of iterations is effectively reduced.

Figure 8A:
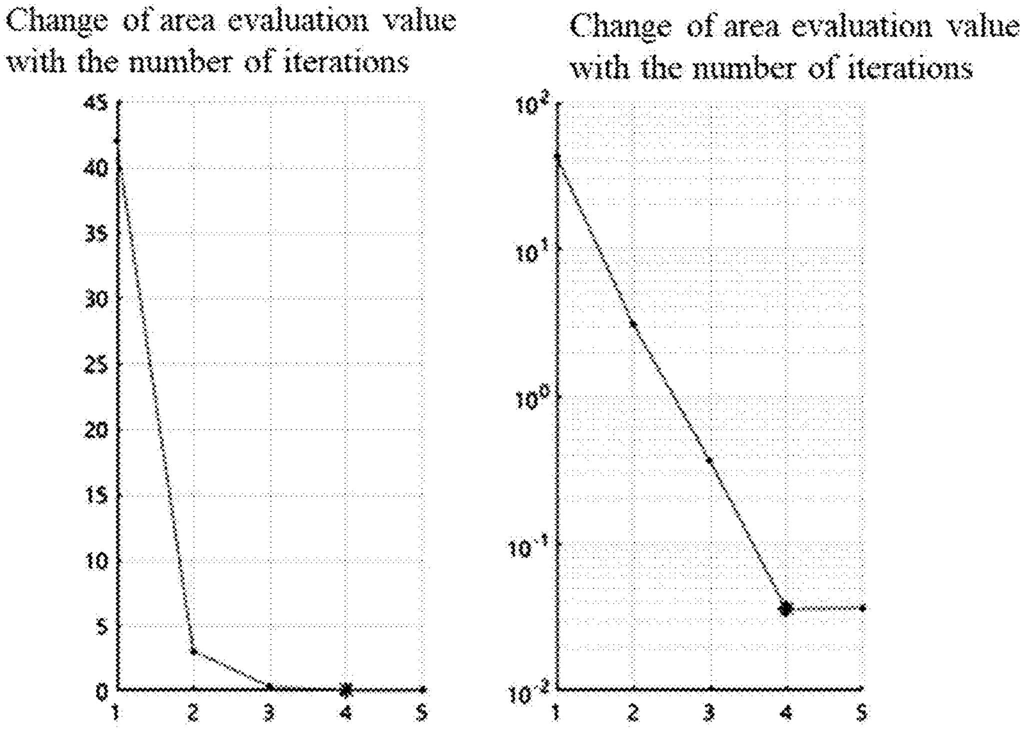
FIGS. 8A to 8C are schematic diagrams showing display effect evaluation in an iterative process according to some embodiments of the present disclosure.
Figure 8B:
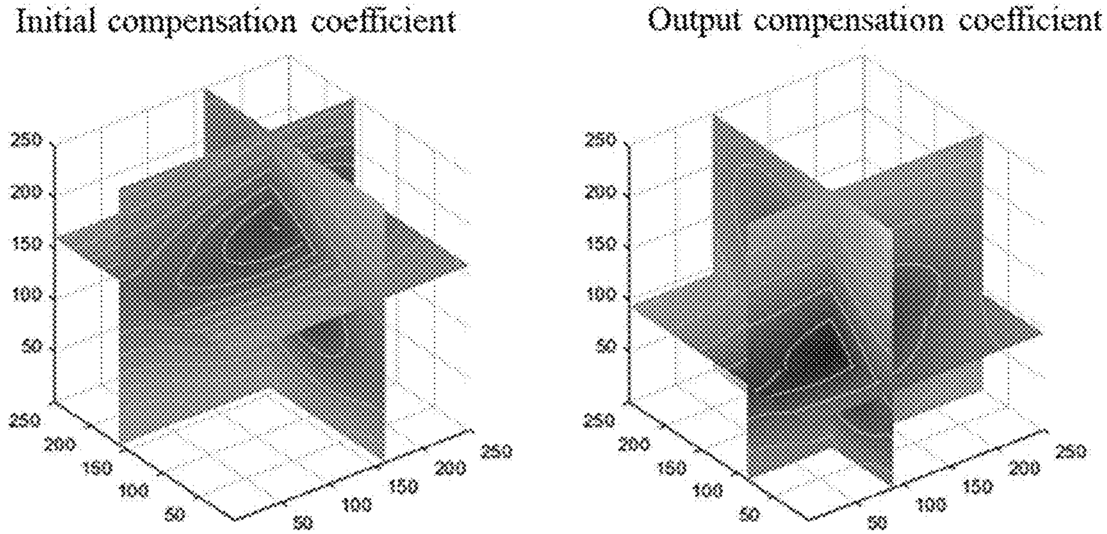
Figure 8C:
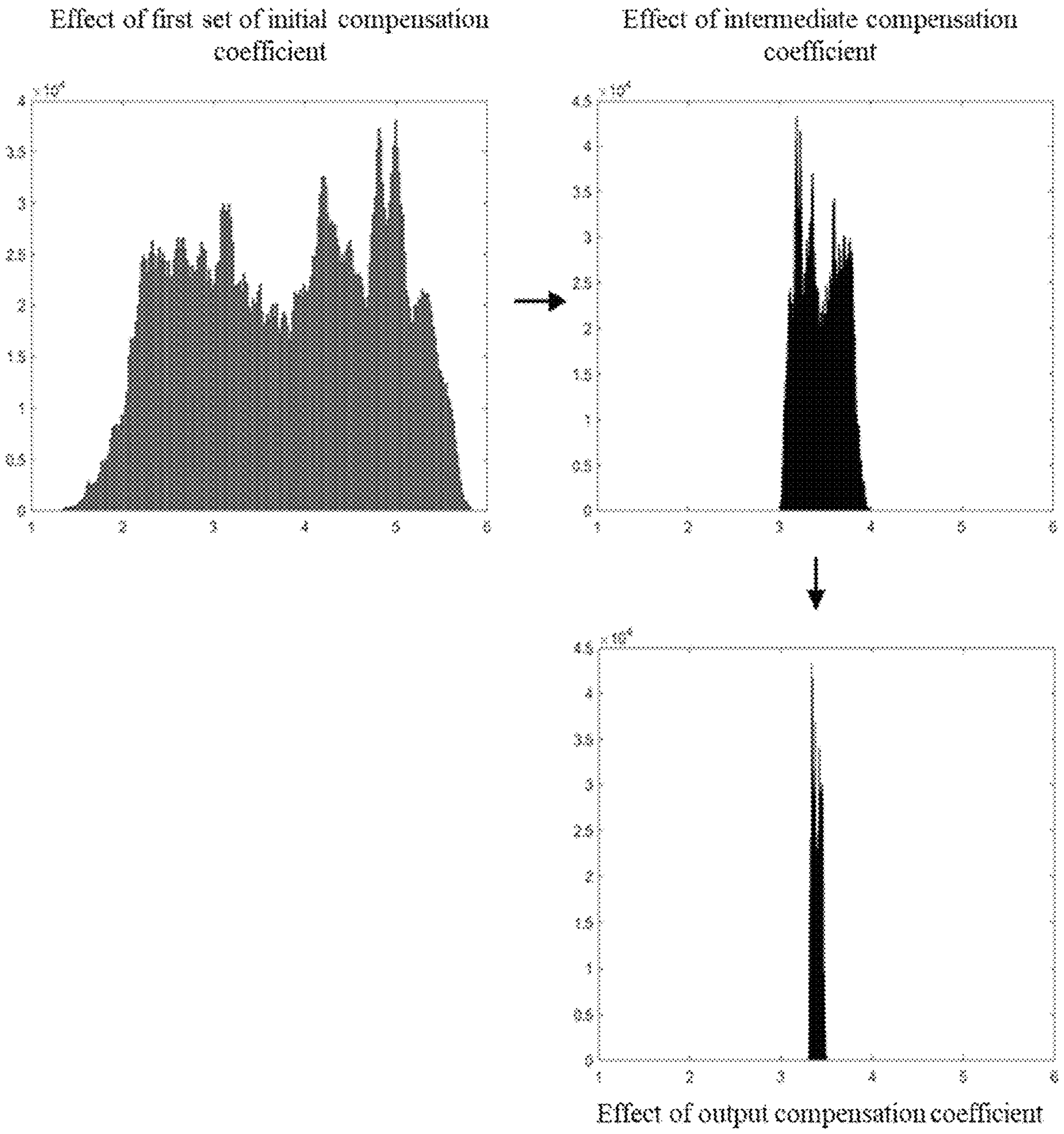

FIGS. 8A to 8C are schematic diagrams showing display effect evaluation in an iterative process according to some embodiments of the present disclosure. The inventor performed simulation verification on the display compensation methods of the display panel shown in FIG. 2D and FIG. 7A to FIG. 7D. In FIG. 8A, the abscissa represents the number of iterations, and the ordinate represents the area evaluation value. In FIG. 8B, the three-dimensional coordinates respectively correspond to the compensation coefficients of the first sub-pixels, the second sub-pixels, and the third sub-pixels normalized to 0 to 255, and the colors represent the area evaluation values. FIG. 8C is a luminance distribution histogram, the abscissa represents the luminance, and the ordinate represents the number of pixels.

The simulation results show that with each update of the target areas in the target area set and the intermediate compensation coefficient, the performance index of the displayed image is gradually improved. Moreover, the convergence speed is fast. After 4 iterations, the performance index of the displayed image meets the requirements, as shown in FIG. 8A. In order to concretely reflect a change from the third iteration to the fourth iteration, the logarithm (i.e., log) of the area evaluation value is taken to obtain a schematic diagram of the area evaluation value (log) changing with the number of iterations in FIG. 8A.

Correspondingly, compared with the displayed image using the first set of initial compensation coefficients, the displayed image using the output compensation coefficients has a better display effect, as shown in FIG. 8B. In FIG. 8B, the darker the color, the better the display effect.

In addition, the uniformity of the display panel is improved with each update of the target areas in the target area set and the intermediate compensation coefficient. As shown in FIG. 8C, taking the histogram distribution of luminance data as an example, a distribution range of the luminance data of a displayed image corresponding the application of the first set of initial compensation coefficients is wider than a distribution range of the luminance data of a displayed image corresponding to the application of the intermediate compensation coefficients. The distribution range of the luminance data of the displayed image corresponding to the application of the intermediate compensation coefficients is wider than a distribution range of the luminance data of a displayed image corresponding to the application of the output compensation coefficient. Therefore, the display uniformity of the displayed image corresponding to the application of the first set of initial compensation coefficients is worse than the display uniformity of the displayed image corresponding to the application of the intermediate compensation coefficients, and the display uniformity of the displayed image corresponding to the application of the intermediate compensation coefficients is worse than the display uniformity of the displayed image corresponding to the application of the output compensation coefficient.

The simulation results shown in FIGS. 8A to 8C show that the display compensation method for the display panel provided by the present disclosure may realize automatic adjustment of the compensation coefficient, which is beneficial to improving the uniformity and color accuracy of the display effect of the display panel, and may further reduce manual intervention and improve adjustment efficiency.

Figure 9:
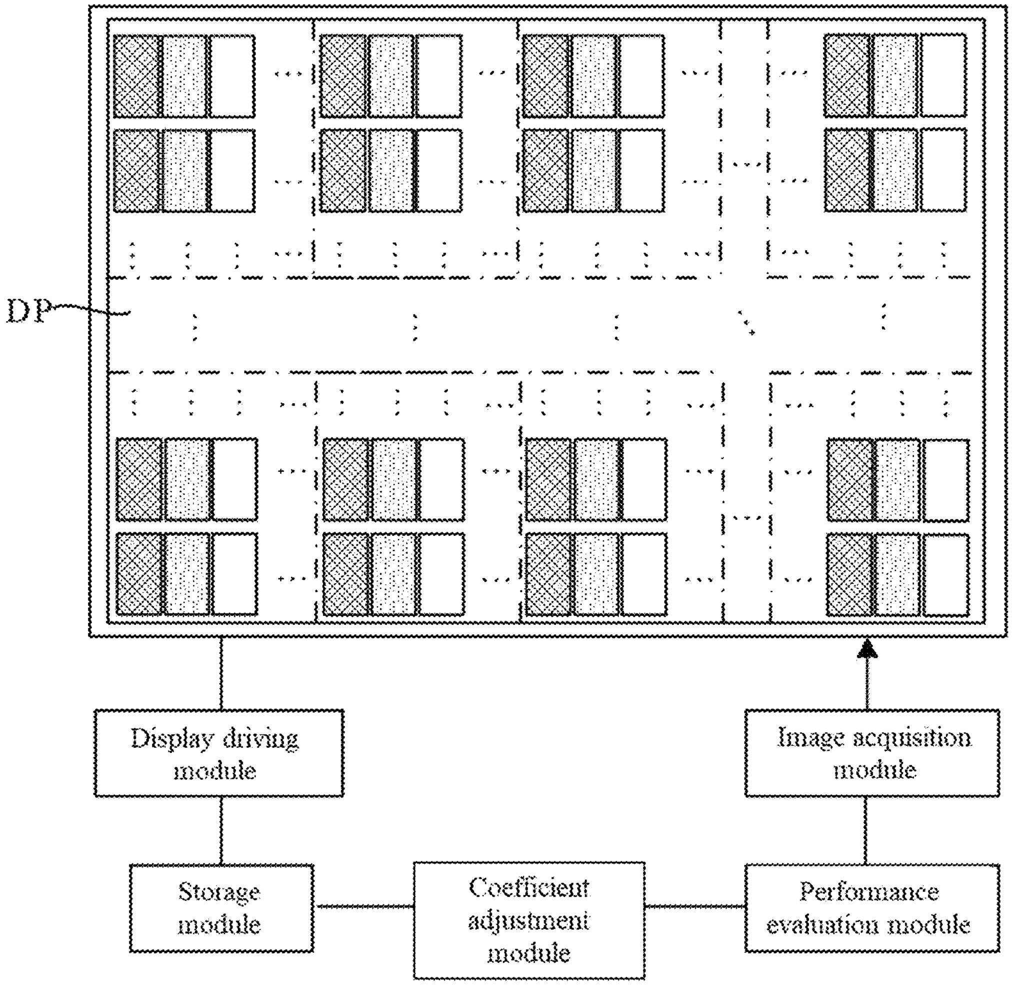
FIG. 9 is a schematic structural diagram of a display compensation system for a display panel according to some embodiments of the present disclosure.

FIG. 9 is a schematic structural diagram of a display compensation system for a display panel according to some embodiments of the present disclosure. The present disclosure further provides a display compensation system for a display panel, which is used to implement the above display compensation methods for the display panel.

The display compensation system of the display panel DP includes a display panel DP, a display driving module, an image acquisition module, a performance evaluation module, a coefficient adjustment module, and a storage module.

The display driving module is electrically connected to the display panel DP, and the display driving module is configured to apply a display compensation coefficient to control the display panel DP for display under a corresponding binding point grayscale. The display compensation coefficient includes a first set of initial compensation coefficients and an output compensation coefficient.

The image acquisition module is configured to obtain image data when the display panel DP applies the display compensation coefficient to display under the corresponding binding point grayscale.

The performance evaluation module is electrically connected to the image acquisition module, and is configured to determine whether the performance index of the displayed image meets the standard based on the image data.

The coefficient adjustment module is electrically connected to the performance evaluation module. When the performance evaluation module determines that the performance index of the displayed image does not meet the standard, the coefficient adjustment module is configured to obtain a plurality of area evaluation values corresponding to different display areas of the display panel DP based on average luminance and chrominance data corresponding to the display areas, obtain the target area evaluation value based on the plurality of area evaluation values, determine the display area corresponding to the target area evaluation value as a target area in a target area set, and obtain an output compensation coefficient based on the target compensation coefficient corresponding to the target area included in the target area set.

The storage module is electrically connected to the display driving module and the coefficient adjustment module, and the storage module is configured to store the output compensation coefficients corresponding to different binding point grayscales.

Alternatively, the display panel DP may include passive light emitting display panels DP and self-luminous display panels DP. The passive light-emitting display panels DP include liquid crystal display panels DP, etc. The self-luminous display panels DP include display panels DP in which light-emitting devices such as organic light-emitting diodes, sub-millimeter light-emitting diodes, and micro light-emitting diodes are used as sub-pixels.

Optionally, the display driving module may include a central processing unit, a timing controller, a source driver chip, etc.

Optionally, the image acquisition module may be luminance data acquisition devices such as a high-precision color camera or a color analyzer.

Optionally, the performance evaluation module may include a central processing unit, a timing controller, etc., and may be a measurement device, etc.

Optionally, the coefficient adjustment module may include a central processing unit, etc.

Optionally, the storage module may include a volatile or non-volatile memory.

Since the target compensation coefficient corresponding to the target area is further calculated, the compensation coefficient may further include second sets of initial compensation coefficients, etc. Correspondingly, the display compensation system of the display panel DP may further include a data processing module. The image acquisition module is further configured to obtain the initial luminance and chrominance data of the corresponding target area when the second sets of initial compensation coefficients are applied to the display panel DP for display under the corresponding binding point grayscale. The data processing module is configured to obtain a plurality of sets of compensation coefficient deviations based on the second sets of initial compensation coefficients, and obtain a plurality of sets of luminance and chrominance deviations corresponding to the target area based on the initial luminance and chrominance data corresponding to the target area, so as to obtain, based on the plurality of sets of compensation coefficient deviations and the plurality of sets of luminance and chrominance deviations corresponding to the target area, a deviation relationship matrix between the compensation coefficient deviations and the luminance and chrominance deviations corresponding to the target area; and obtain a deviation between the target compensation coefficient and the reference compensation coefficient corresponding to the target area based on the deviation relationship matrix and the deviation between the second luminance and chrominance data and the reference luminance and chrominance data corresponding to the target area, so as to obtain the target compensation coefficient corresponding to the target area based on the reference compensation coefficient corresponding to the target area and the deviation between the target compensation coefficient and the reference compensation coefficient corresponding to the target area.

It should be noted that the coefficient adjustment module may further be used as the data processing module, or the coefficient adjustment module may be set independently from the data processing module. The storage module may be integrated into the display driving module.

Figure 10:
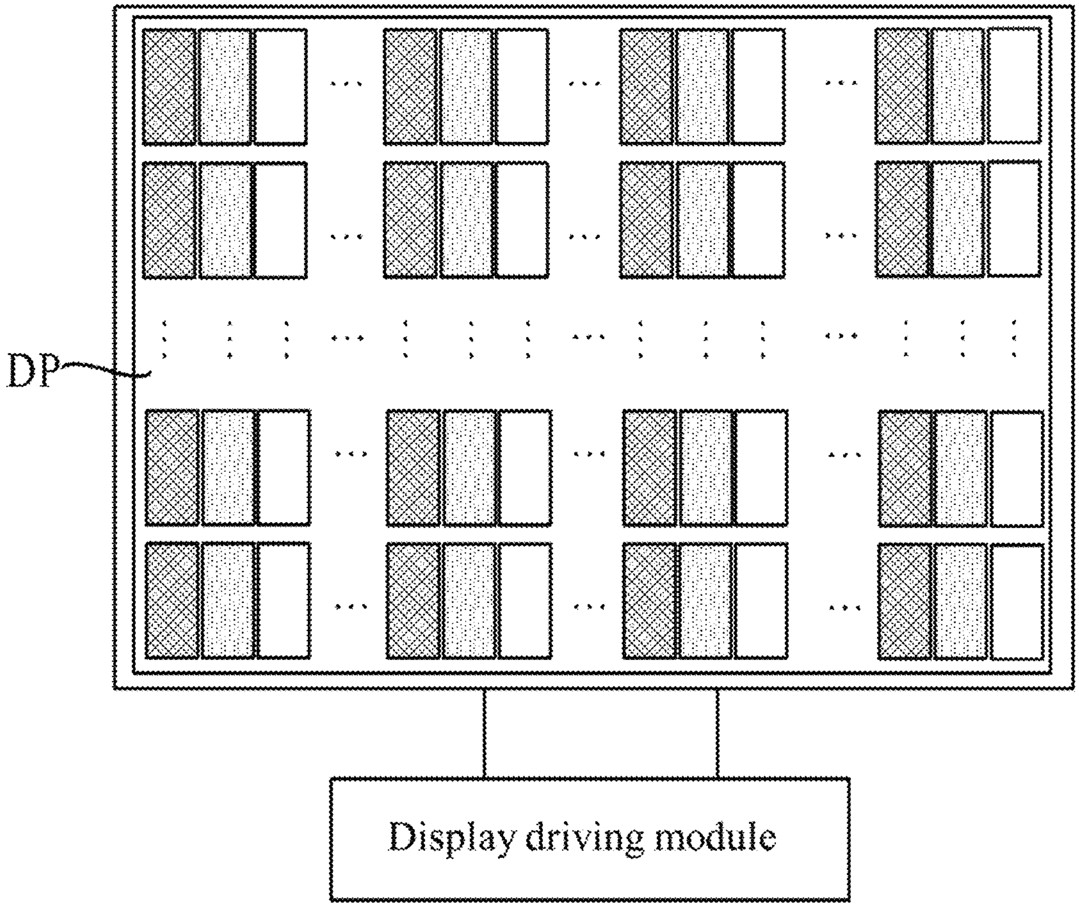
FIG. 10 is a schematic structural diagram of a display device according to some embodiments of the present disclosure.

FIG. 10 is a schematic structural diagram of a display device according to some embodiments of the present disclosure. Some embodiments of the present disclosure further provide a display device, including the display panel DP and the display driving module.

The display driving module is electrically connected to the display panel DP. The display driving module is configured to apply the output compensation coefficient obtained by any of the above display compensation methods or any of the above display compensation systems to control the display of the display panel DP.

Some embodiments of the present disclosure further provide a computer device, which includes a memory, a processor, and a computer program stored in the memory and executable on the processor. When executing the computer program, the processor implements the operations of any of the above display compensation methods of the display panel.

Some embodiments of the present disclosure further provide a computer-readable storage medium, which stores a computer program. When the computer program is executed by a processor, the operations of any of the above display compensation methods of the display panel are implemented.

This disclosure uses specific examples to illustrate the principles and implementation methods of the present disclosure. The description of the above embodiments is only used to help understand the methods of the present disclosure and its core idea. For those skilled in the art, based on the concept of the present disclosure, specific implementations and an application scope may be changed. In summary, the content of this description should not be construed as limiting the present disclosure.

What is claimed is:

1. A display compensation method for a display panel, comprising:

obtaining image data of a displayed image of the display panel when a first set of initial compensation coefficients is applied to control the display panel to display under a corresponding binding point grayscale;

determining, based on the image data, whether a performance index of the displayed image satisfies a standard, and obtaining, in response to determining that the performance index of the displayed image does not satisfy the standard, a plurality of area evaluation values respectively corresponding to a plurality of display areas of the display panel based on average luminance and chrominance data corresponding to the display areas;

wherein the obtaining, in response to determining that the performance index of the displayed image does not satisfy the standard, the plurality of area evaluation values comprises obtaining a first target and chrominance data, and calculating a deviation between the average luminance and chrominance data corresponding to each display area and the first target luminance and chrominance data, to obtain the area evaluation value corresponding to the display area;

obtaining a target area evaluation value based on the plurality of area evaluation values, and determining at least one of the plurality of display areas corresponding to the target area evaluation value as a target area in a target area set; and obtaining a target compensation coefficient corresponding to the target area in the target area set, and obtaining an output compensation coefficient based on the obtained target compensation coefficient, so as to apply the output compensation coefficient for the display panel to display.

2. The method of claim 1, wherein the first target luminance and chrominance data is average luminance and chrominance data corresponding to a central display area of the display panel.

3. The method of claim 1, wherein the obtaining of the target area evaluation value based on the plurality of area evaluation values, and the determination of the display area corresponding to the target area evaluation value as the target area in the target area set comprises:

selecting a maximum area evaluation value from the plurality of area evaluation values as the target area evaluation value; and determining the display area corresponding to the target area evaluation value as the target area in the target area set.

4. The method of claim 1, wherein the obtaining of the target compensation coefficient corresponding to the target area in the target area set comprises:

obtaining initial luminance and chrominance data of the target area of the display panel when second sets of initial compensation coefficients are applied to control the display panel to display under the corresponding binding point grayscale;

obtaining a plurality of sets of compensation coefficient deviations based on the second sets of initial compensation coefficients, and obtaining a plurality of sets of luminance and chrominance deviations corresponding to the target area based on the initial luminance and chrominance data corresponding to the target area;

obtaining, based on the plurality of sets of compensation coefficient deviations and the plurality of sets of luminance and chrominance deviations corresponding to the target area, a deviation relationship matrix between the compensation coefficient deviations and the luminance and chrominance deviations corresponding to the target area;

obtaining, based on the deviation relationship matrix, and a deviation between second target luminance and chrominance data and reference luminance and chrominance data corresponding to the target area, a deviation between the target compensation coefficient and a reference compensation coefficient corresponding to the target area; and obtaining the target compensation coefficient corresponding to the target area based on the reference compensation coefficient corresponding to the target area, and the deviation between the target compensation coefficient and the reference compensation coefficient corresponding to the target area.

5. The method of claim 4, wherein the obtaining of the initial luminance and chrominance data of the target area of the display panel when the second sets of initial compensation coefficients are applied to control the display panel to display under the corresponding binding point grayscale comprises:

converting luminance and chrominance data of the display panel when the second sets of initial compensation coefficients are applied to control the display panel to display under the corresponding binding point grayscale, into Lab space to obtain the initial luminance and chrominance data corresponding to the target area.

6. The method of claim 4, wherein the obtaining of the plurality of sets of compensation coefficient deviations based on the second sets of initial compensation coefficients, and the obtaining of the plurality of sets of luminance and chrominance deviations corresponding to the target area based on the initial luminance and chrominance data corresponding to the target area comprises:

selecting one second set of initial compensation coefficient from the second sets of initial compensation coefficients as the reference compensation coefficient, and calculating a deviation between the reference compensation coefficient and each of remaining second sets of initial compensation coefficients to obtain the plurality of sets of compensation coefficient deviations; and using, among the plurality of sets of initial luminance and chrominance data corresponding to the target area, the initial luminance and chrominance data corresponding to the reference compensation coefficient as the reference luminance and chrominance data, and calculating a deviation between the reference luminance and chrominance data and each of remaining initial luminance and chrominance data to obtain the plurality of sets of luminance and chrominance deviations.

7. The method of claim 4, wherein in the obtaining of the deviation relationship matrix between the compensation coefficient deviations and the luminance and chrominance deviations corresponding to the target area based on the plurality of sets of compensation coefficient deviations and the plurality of sets of luminance and chrominance deviations corresponding to the target area, the deviation relationship matrix is obtained according to the following formula:

$$(\text{Gain\_all}-\text{Gain\_end})\times M=\text{Meas\_all}-\text{Meas\_end},$$

where M represents the deviation relationship matrix, Gain_all represents the second sets of initial compensation coefficients, Gain_end represents the reference compensation coefficient corresponding to the target area, Meas_all represents the plurality of sets of initial luminance and chrominance data, and Meas_end represents the reference luminance and chrominance data.

8. The method of claim 4, wherein the deviation between the target compensation coefficient and the reference compensation coefficient corresponding to the target area is obtained according to the following formula:

$$(\text{Gain\_tar}-\text{Gain\_end})\times M=\text{Meas\_tar}-\text{Meas\_end},$$

where Gain_tar represents the target compensation coefficient, Gain_end represents the reference compensation coefficient corresponding to the target area, M represents the deviation relationship matrix, Meas_tar represents the second target luminance and chrominance data, and Meas_end represents the reference luminance and chrominance data.

9. The method of claim 4, wherein the second target luminance and chrominance data is initial luminance and chrominance data corresponding to the central display area of the display panel when the reference compensation coefficient is applied to control the display panel to display.

10. The method of claim 4, wherein the obtaining of the target compensation coefficient corresponding to the target area based on the reference compensation coefficient corresponding to the target area and the deviation between the target compensation coefficient and the reference compensation coefficient corresponding to the target area comprises:

calculating a sum of the deviation between the target compensation coefficient and the reference compensation coefficient corresponding to the target area and the reference compensation coefficient to obtain the target compensation coefficient.

11. The method of claim 4, wherein the display panel comprises a plurality of sub-pixels, the plurality of sub-pixels comprise a plurality of first sub-pixels, a plurality of second sub-pixels, and a plurality of third sub-pixels, a luminous color of the first sub-pixels, a luminous color of the second sub-pixels, and a luminous color of the third sub-pixels are different, and the first set of initial compensation coefficients and each second set of initial compensation coefficients respectively comprise a first initial compensation sub-coefficient corresponding to the first sub-pixels, a second initial compensation sub-coefficient corresponding to the second sub-pixels, and a third initial compensation sub-coefficient corresponding to the third sub-pixels.

12. The method of claim 1, wherein the obtaining of the output compensation coefficient based on the obtained target compensation coefficient comprises:

using the obtained target compensation coefficient as the output compensation coefficient.

13. The method of claim 1, wherein the obtaining of the target compensation coefficient corresponding to the target area in the target area set, and the obtaining of the output compensation coefficient based on the obtained target compensation coefficient comprises:

obtaining the target compensation coefficient corresponding to the target area included in the target area set, and obtaining an intermediate compensation coefficient based on the obtained target compensation coefficient; and executing at least one iteration of an iterative process until the performance index of the displayed image when the intermediate compensation coefficient is applied to control the display panel to display satisfies the standard, each iteration including:

obtaining image data of a displayed image when the intermediate compensation coefficient is applied to control the display panel to display, determining whether the performance index of the displayed image satisfies the standard based on the image data, updating, in response to determining that the performance index of the displayed image does not satisfy the standard, the target area evaluation value, the target area, the target compensation coefficient, and the intermediate compensation coefficient, and updating the target area set based on the updated target area, and initiating a next iteration; and determining, in response to determining that the performance index of the displayed image satisfies the standard, the intermediate compensation coefficient corresponding to the performance index satisfying the standard as the output compensation coefficient.

14. The method of claim 13, wherein the updating of the target compensation coefficient in response to determining that the performance index of the displayed image does not satisfy the standard comprises:

when the performance index of the displayed image does not meet the standard, updating the second sets of initial compensation coefficients by using the intermediate compensation coefficient as one set of the second sets of initial compensation coefficients, or by resetting the second sets of initial compensation coefficients and using the intermediate compensation coefficient as one set of the reset second sets of initial compensation coefficients, and updating the initial luminance and chrominance data of the target area when the updated second sets of initial compensation coefficients are used for the display panel to display under the corresponding binding point grayscale;

updating the plurality of sets of compensation coefficient deviations based on the updated second sets of initial compensation coefficients, and updating the plurality of sets of luminance and chrominance deviations corresponding to the target area based on the updated initial luminance and chrominance data of the corresponding target area;

updating the deviation relationship matrix between the compensation coefficient deviations and the luminance and chrominance deviations corresponding to the target area, based on the plurality of sets of updated compensation coefficient deviations and the plurality of sets of updated luminance and chrominance deviations corresponding to the target area;

updating, based on the updated deviation relationship matrix and the deviation between the second target luminance and chrominance data and the reference luminance and chrominance data corresponding to the target area, the deviation between the target compensation coefficient and the reference compensation coefficient corresponding to the target area; and updating the target compensation coefficient corresponding to the target area based on the reference luminance and chrominance data corresponding to the target area and the deviation between the target compensation coefficient and the reference compensation coefficient corresponding to the target area.

15. The method of claim 14, wherein the obtaining of the plurality of sets of compensation coefficient deviations based on the updated second sets of initial compensation coefficients, and the obtaining of the plurality of sets of luminance and chrominance deviations corresponding to the target area based on the initial luminance and chrominance data of the corresponding target area comprises:

taking the intermediate compensation coefficient as the reference compensation coefficient, and calculating the deviation between the reference compensation coefficient and each of the remaining second sets of initial compensation coefficients to obtain the plurality of sets of compensation coefficient deviations; and using, among the plurality of sets of initial bright and chrominance data corresponding to the target area, the initial luminance and chrominance data corresponding to the reference compensation coefficient as the reference luminance and chrominance data, and calculating the deviations between the reference luminance and chrominance data and the remaining initial luminance and chrominance data, to obtain the plurality of sets of luminance and chrominance deviations.

16. The method of claim 15, wherein in the obtaining of the deviation relationship matrix between the compensation coefficient deviations and the luminance and chrominance deviations corresponding to the target area based on the plurality of sets of compensation coefficient deviations and the plurality of sets of luminance and chrominance deviations corresponding to the target area, a weight of the intermediate compensation coefficient is greater than weights of the remaining second sets of the initial compensation coefficients.

17. The method of claim 13, wherein the updating of the intermediate compensation coefficient in response to determining that the performance index of the displayed image does not satisfy the standard comprises:

obtaining, based on the obtained target compensation coefficient, a median value of target compensation coefficients corresponding to the target areas included in the updated target area set, and taking the median value as the intermediate compensation coefficient.

18. A display compensation method for a display panel, comprising:

a display panel;

a display driving module electrically connected to the display panel, wherein the display driving module is configured to apply a display compensation coefficient to control the display panel to display under a corresponding binding point grayscale, and the display compensation coefficient comprises a first set of initial compensation coefficients and an output compensation coefficient;

an image acquisition module configured to obtain image data of a displayed image of the display panel when the compensation coefficient is applied to control the display panel to display under the corresponding binding point grayscale;

a performance evaluation module electrically connected to the image acquisition module and configured to determine whether a performance index of the displayed image satisfies a standard based on the image data;

a coefficient adjustment module electrically connected to the performance evaluation module, wherein when the performance evaluation module determines that the performance index of the displayed image does not satisfy the standard, the coefficient adjustment module is configured to obtain a plurality of area evaluation values respectively corresponding to a plurality of display areas of the display panel based on average luminance and chrominance data corresponding to the display areas, obtain a target area evaluation value based on the plurality of area evaluation values, determine at least one of the plurality of display area corresponding to the target area evaluation value as a target area in a target area set, and obtain the output compensation coefficient based on the target compensation coefficient corresponding to the target area included in the target area set; wherein obtaining the plurality of area evaluation values comprises obtaining a first target and chrominance data, and calculating a deviation between the average luminance and chrominance data corresponding to each display area and the first target luminance and chrominance data, to obtain the area evaluation value corresponding to the display area; and a storage module electrically connected to the display driving module and the coefficient adjustment module, wherein the storage module is configured to store output compensation coefficients corresponding to different binding point grayscales.

19. A display device, comprising:

a display panel; and a display driving module electrically connected to the display panel, wherein the display driving module is configured to perform a display compensation method for the display panel to obtain an output compensation coefficient and apply the output compensation coefficient to control the display panel to display, the method comprising:

obtaining image data of a displayed image of the display panel when a first set of initial compensation coefficients is applied to control the display panel to display under a corresponding binding point grayscale;

determining, based on the image data, whether a performance index of the displayed image satisfies a standard, and obtaining, in response to determining that the performance index of the displayed image does not satisfy the standard, a plurality of area evaluation values respectively corresponding to a plurality of display areas of the display panel based on average luminance and chrominance data corresponding to the display areas;

wherein the obtaining, in response to determining that the performance index of the displayed image does not satisfy the standard, the plurality of area evaluation values comprises obtaining a first target and chrominance data, and calculating a deviation between the average luminance and chrominance data corresponding to each display area and the first target luminance and chrominance data, to obtain the area evaluation value corresponding to the display area;

obtaining a target area evaluation value based on the plurality of area evaluation values, and determining at least one of the plurality of display areas corresponding to the target area evaluation value as a target area in a target area set; and obtaining a target compensation coefficient corresponding to the target area in the target area set, and obtaining an output compensation coefficient based on the obtained target compensation coefficient, so as to apply the output compensation coefficient for the display panel to display.

* * * * *